US012767585B2

(12) United States Patent
Sasaki

(10) Patent No.: US 12,767,585 B2
(45) Date of Patent: Oct. 20, 2026

(54) OPTICAL GLASS, OPTICAL ELEMENT BLANK, AND OPTICAL ELEMENT

(71) Applicants: HOYA CORPORATION, Tokyo (JP); HOYA OPTICAL TECHNOLOGY (WEIHAI) CO., LTD., ShanDong (CN)

(72) Inventor: Hayato Sasaki, Tokyo (JP)

(73) Assignees: HOYA CORPORATION, Tokyo (JP); HOYA OPTICAL TECHNOLOGY (WEIHAI) CO., LTD., Shandong (CN)

( * ) Notice: Subject to any disclaimer, the term of this patent is extended or adjusted under 35 U.S.C. 154(b) by 632 days.

(21) Appl. No.: 18/115,842

(22) Filed: Mar. 1, 2023

(65) Prior Publication Data

US 2023/0278913 A1 Sep. 7, 2023

(30) Foreign Application Priority Data

Mar. 7, 2022 (JP) ................................ 2022-034706

(51) Int. Cl.

*C03C 3/21* (2006.01)
*C03C 3/062* (2006.01)
*F21V 8/00* (2006.01)
*G02B 27/01* (2006.01)

(52) U.S. Cl.

CPC ................ *C03C 3/21* (2013.01); *C03C 3/062* (2013.01); *G02B 6/0065* (2013.01); *G02B 27/0172* (2013.01); *G02B 6/0025* (2013.01); *G02B 6/0026* (2013.01); *G02B 6/003* (2013.01); *G02B 2027/0132* (2013.01); *G02B 2027/0174* (2013.01); *G02B 2027/0178* (2013.01)

(58) Field of Classification Search

CPC ........................................................ C03C 3/21
See application file for complete search history.

(56) References Cited

U.S. PATENT DOCUMENTS

2002/0042337 A1 4/2002 Zou et al.
2002/0073735 A1 6/2002 Hayashi et al.
2005/0164862 A1 7/2005 Shiraishi et al.
2019/0322571 A1* 10/2019 Aitken ...................... C03C 4/00
2022/0234941 A1* 7/2022 Aitken ...................... C03C 3/21

FOREIGN PATENT DOCUMENTS

CN 101591142 A 12/2009
CN 101941797 A 1/2011
CN 107417094 A * 12/2017 ............... C03C 3/21
CN 107614449 A 1/2018
CN 109231814 A 1/2019
CN 109399916 A 3/2019
CN 109399917 A 3/2019
CN 110691760 A 1/2020
CN 111253063 A 6/2020
CN 111253064 A 6/2020
CN 111253066 A 6/2020
JP 2012-17261 A 1/2012
JP 2013-212935 A 10/2013
JP 2013-227197 A 11/2013
JP 2015-63460 A 4/2015
JP 2019-182680 A 10/2019
JP 2020-505311 A 2/2020
JP 2020019710 A * 2/2020 ............... G02B 1/00
WO 2017/006998 A1 1/2017
WO 2018/140390 A1 8/2018
WO 2022/159275 A1 7/2022
WO 2022/159277 A1 7/2022
WO 2022/159280 A1 7/2022

OTHER PUBLICATIONS

Notice of Reasons for Refusal that issued in corresponding Japanese Patent Appl. No. 2022-034706, mailed Aug. 26, 2025, along with English translation thereof.
Notice of Reasons for Refusal that issued in corresponding Japanese Patent Appl. No. 2022-034718, mailed Sep. 17, 2025, along with English translation thereof.
Notice of Reasons for Refusal that issued in corresponding Japanese Patent Appl. No. 2022-034719, mailed Oct. 15, 2025, along with English translation thereof.
Notice of Reasons for Refusal that issued in corresponding Japanese Patent Appl. No. 2022-034706, mailed Jan. 6, 2026, along with English translation thereof.
Notice of Reasons for Refusal that issued in corresponding Japanese Patent Appl. No. 2022-034719, mailed Apr. 1, 2026, along with English translation thereof.
Final Office Action that issued in U.S. Appl. No. 18/115,832, dated Jan. 16, 2026.
Office Action that issued in U.S. Appl. No. 18/115,832, dated Aug. 28, 2025.
Notice of Allowance that issued in U.S. Appl. No. 18/115,838, dated Sep. 10, 2025.
Corrected Notice of Allowance that issued in U.S. Appl. No. 18/115,838, dated Oct. 22, 2025.
Office Action that issued in U.S. Appl. No. 18/115,838, dated Jan. 16, 2026.
Final Office Action that issued in U.S. Appl. No. 18/115,838, dated Jun. 2, 2026.
Office Action that issued in Taiwanese Application No. 112108056, dated Jun. 17, 2026, along with English language translation thereof.
Office Action that issued in Chinese Application No. 202310205940.3, dated Aug. 12, 2026, along with English language translation thereof.
Office Action that issued in Japanese Application No. 2022-034719, dated Sep. 1, 2026, along with English language translation thereof.

* cited by examiner

*Primary Examiner* — Elizabeth A. Bolden
(74) *Attorney, Agent, or Firm* — Greenblum & Bernstein, P.L.C.

(57) ABSTRACT

Provided is optical glass in which a refractive index nd is 1.950 or more, an amount of $P_2O_5$ is 10.0 to 40.0 mass %, an amount of $TiO_2$ is 5.0 to 40.0 mass %, an amount of $Nb_2O_5$ is 20.0 to 60.0 mass %, an amount of $Bi_2O_3$ is 20.0 mass % or less, a total amount of $Al_2O_3$ and $SiO_2$ [$Al_2O_3$+$SiO_2$] is 2.0 mass % or less, a total amount of $Li_2O$, $Na_2O$, and $K_2O$ [$Li_2O$+$Na_2O$+$K_2O$] is 5.0 mass % or less, and a total amount of ZnO, SrO, and BaO [ZnO+SrO+BaO] is 0.01 to 12.0 mass %.

17 Claims, 2 Drawing Sheets

[FIG. 1A]
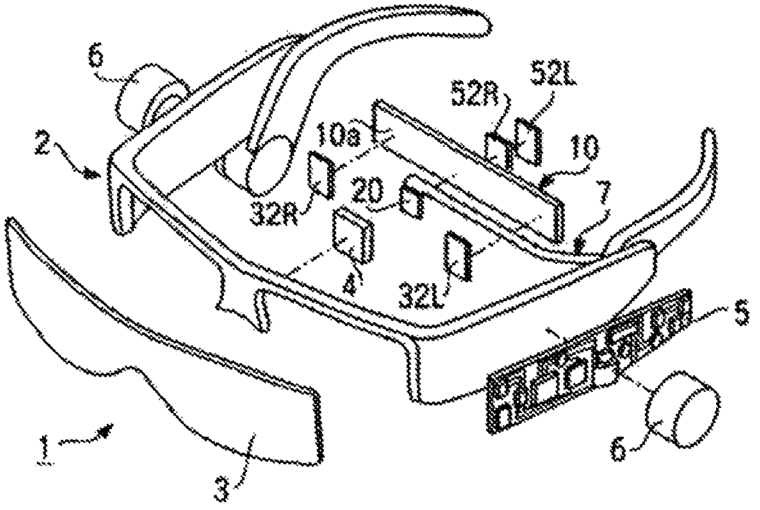
(a)
[FIG. 1B]
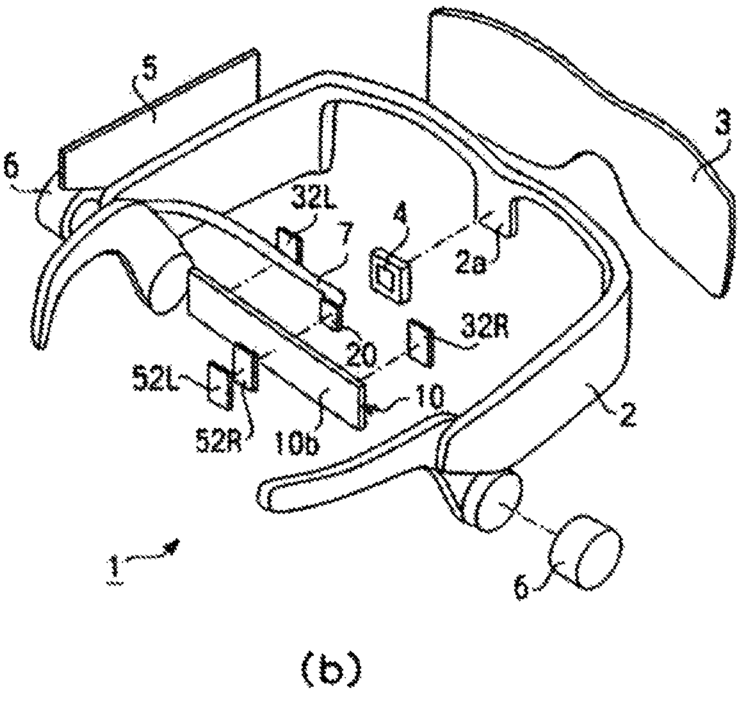
(b)

[FIG. 2]
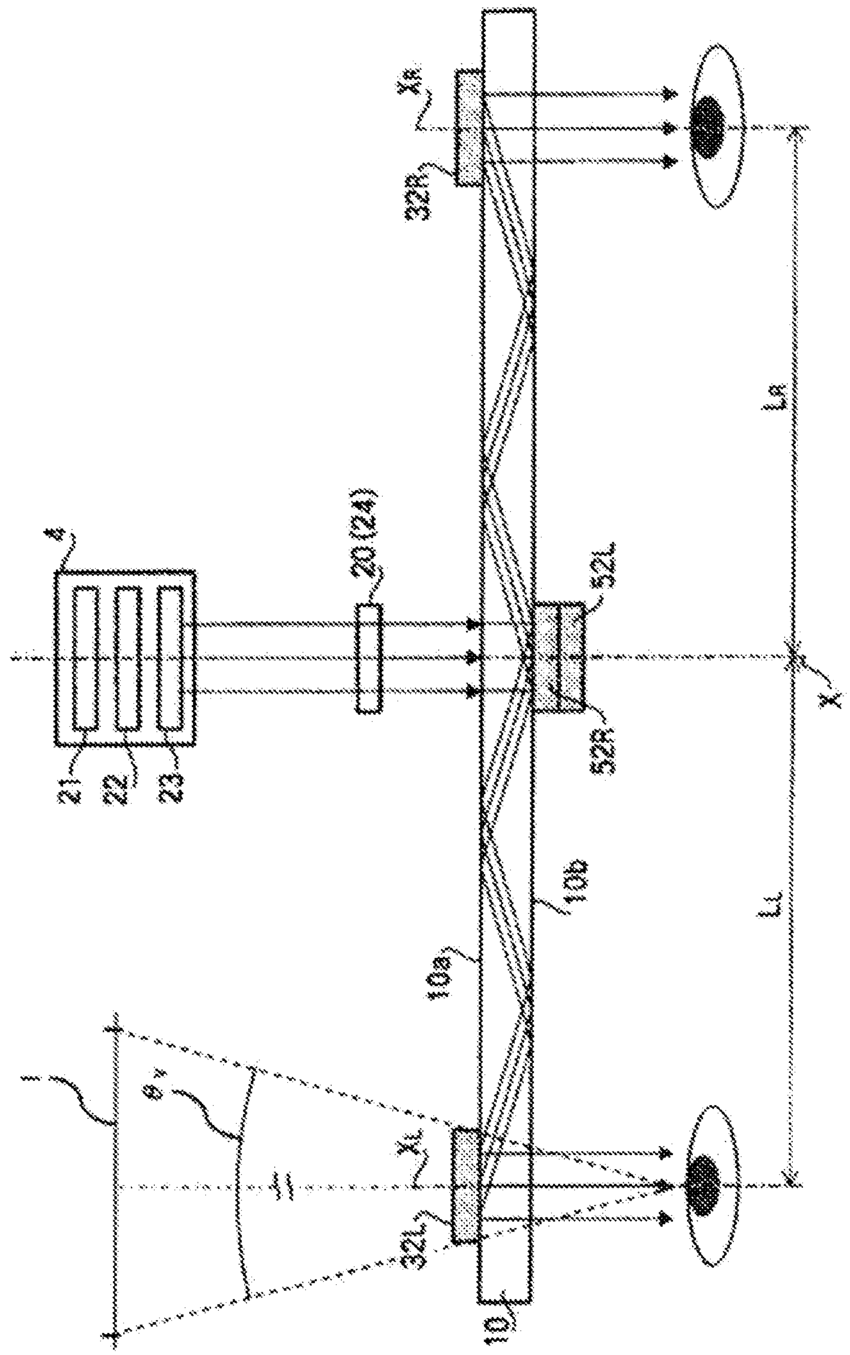

OPTICAL GLASS, OPTICAL ELEMENT BLANK, AND OPTICAL ELEMENT

TECHNICAL FIELD

The present invention relates to optical glass, an optical element blank, and an optical element.

BACKGROUND ART

In recent years, with the progress of an augmented reality (AR) technology, for example, a goggle-type or an eyeglass-type display device has been developed as an AR device. For example, a lens having a high refractive index and a low specific gravity is required for the goggle-type display device, and a demand for glass applicable to the lens is increasing.

JP 2012-17261 A, JP 2013-212935 A, JP 2013-227197 A, and JP 2015-63460 A disclose optical glass containing Ti and Nb as a high-refractive-index optical glass. However, it is estimated that the above optical glass has a too large specific gravity relative to a refractive index to be employed as the lens for the AR device in consideration of the composition.

Here, there is a demand for optical glass in which the specific gravity is reduced while maintaining the high refractive index.

[Patent Literature 1] JP 2012-17261 A

[Patent Literature 2] JP 2013-212935 A

[Patent Literature 3] JP 2013-227197 A

[Patent Literature 4] JP 2015-63460 A

SUMMARY OF THE INVENTION

The present invention has been made in consideration of such circumstances, and an object thereof is to provide optical glass and an optical element in which a refractive index is high, and a specific gravity is relatively low.

The gist of the present invention is as follows.

(1) Optical glass, wherein a refractive index nd is 1.950 or more, an amount of $P_2O_5$ is 10.0 to 40.0 mass %, an amount of $TiO_2$ is 5.0 to 40.0 mass %, an amount of $Nb_2O_5$ is 20.0 to 60.0 mass %, an amount of $Bi_2O_3$ is 20.0 mass % or less, a total amount of $Al_2O_3$ and $SiO_2$ [$Al_2O_3$+$SiO_2$] is 2.0 mass % or less, a total amount of $Li_2O$, $Na_2O$, and $K_2O$ [$Li_2O$+$Na_2O$+$K_2O$] is 5.0 mass % or less, and a total amount of ZnO, SrO, and BaO [ZnO+SrO+BaO] is 0.01 to 12.0 mass %.

(2) An optical element blank comprising the optical glass according to (1).

(3) An optical element comprising the optical glass according to (1).

According to the present invention, it is possible to provide optical glass and an optical element in which a refractive index is high and a specific gravity is relatively low.

BRIEF DESCRIPTION OF THE DRAWINGS

FIGS. 1A and 1B are views illustrating a configuration of a head-mounted display that uses a light guide plate as an aspect of the present invention; and FIG. 2 is a side view schematically illustrating a configuration of the head-mounted display that uses the light guide plate as an aspect of the present invention.

In the present invention and in this specification, a glass composition is noted on the basis of oxides unless otherwise stated. Here, "oxide-based glass composition" represents a glass composition obtained by conversion on the assumption that glass raw materials are totally decomposed at the time of melting, and exist as oxides in glass. The total amount of all glass components noted on the basis of oxides (excluding Sb ($Sb_2O_3$), Ce ($CeO_2$), and Sn ($SnO_2$) which are added as a clarification agent) is set to 100 mass %. Notation of the respective glass components conforms to custom, and is described as $SiO_2$, $TiO_2$, and the like. The amount and the total amount of the glass components are based on a mass unless otherwise stated, and "%" represents "mass %".

The amount of a glass component can be measured by a known method, for example, a method such as inductively coupled plasma atomic emission spectroscopic analysis (ICP-AES) and inductively coupled plasma mass spectrometry (ICP-MS). In addition, in this specification and the present invention, when the amount of a constituent component is 0%, this represents that the constituent component is substantially not contained, and the component is allowed to be contained in an unavoidable impurity level.

In addition, in this specification, a refractive index represents a refractive index nd in a d-line of helium (wavelength: 587.56 nm) unless otherwise stated.

In addition, an Abbe number νd is used as a value representing a property relating to dispersion, and is expressed by the following Expression. Here, nF represents a refractive index at an F line of blue hydrogen (wavelength: 486.13 nm), and nC represents a refractive index at a C line of red hydrogen (wavelength: 656.27 nm).

$$\nu d=(nd-1)/(nF-nC)$$

Hereinafter, optical glass according to this embodiment of the present invention will be described. In the optical glass according to this embodiment, a refractive index nd is 1.950 or more, an amount of $P_2O_5$ is 10.0 to 40.0 mass %, an amount of $TiO_2$ is 5.0 to 40.0 mass %, an amount of $Nb_2O_5$ is 20.0 to 60.0 mass %, an amount of $Bi_2O_3$ is 20.0 mass % or less, a total amount of $Al_2O_3$ and $SiO_2$ [$Al_2O_3$+$SiO_2$] is 2.0 mass % or less, a total amount of $Li_2O$, $Na_2O$, and $K_2O$ [$Li_2O$+$Na_2O$+$K_2O$] is 5.0 mass % or less, and a total amount of ZnO, SrO, and BaO [ZnO+SrO+BaO] is 0.01 to 12.0 mass %. Hereinafter, respective requirements will be described.

In the optical glass according to this embodiment, the refractive index nd is 1.950 or more. A lower limit of the refractive index nd is preferably 1.955, and may be 1.960, 1.965, 1.970, 1.975, or 1.980. In addition, an upper limit of the refractive index nd is preferably 2.300, and may be 2.250, 2.200, 2.150, 2.100, or 2.050.

In the optical glass according to this embodiment, the amount of $P_2O_5$ is 10.0 to 40.0%. An upper limit of the amount of $P_2O_5$ is preferably 38.0%, and more preferably, may be 35.0%, 33.0%, 30.0%, or 28.0%. In addition, a lower limit of the amount of $P_2O_5$ is preferably 13.0%, and more preferably, may be 15.0%, 18.0%, or 20.0%.

$P_2O_5$ is a network forming component, and is an essential component for containing a large amount of highly dispersive component in the glass. When the amount of $P_2O_5$ is set to the above-described range, the desired refractive index is easily obtained, and a melting temperature can be controlled within an appropriate range.

In the optical glass according to this embodiment, the amount of $TiO_2$ is 5.0% to 40.0%. An upper limit of the amount of $TiO_2$ is preferably 38.0%, and more preferably, may be 35.0%, 33.0%, 30.0%, 28.0%, or 25.0%. In addition, a lower limit of the amount of $TiO_2$ is preferably 8.0%, and more preferably, may be 10.0%, 13.0%, 15.0%, or 18.0%.

$TiO_2$ greatly contributes to a high refractive index and a high dispersion. In addition, among high-refractive-index components, $TiO_2$ contributes to a low specific gravity. When the amount of $TiO_2$ is set to the above-described range, a high refractive index and a low specific gravity are compatible with each other, and chemical durability can be improved. On the other hand, when the amount of $TiO_2$ is excessively large, the melting temperature may rise, generation of crystals in glass may be promoted in the course of obtaining optical glass by molding and slowly cooling molten glass, and transparency of glass tends to decrease (turbidity tends to occur). In addition, coloration may increase.

In the optical glass according to this embodiment, the amount of $Nb_2O_5$ is 20.0% to 60.0%. An upper limit of the amount of $Nb_2O_5$ is preferably 58.0%, and more preferably, may be 55.0%, 53.0%, 50.0%, or 48.0%. In addition, a lower limit of the amount of $Nb_2O_5$ is preferably 23.0%, and more preferably, may be 25.0%, 28.0%, 30.0%, 33.0%, 35.0%, 38.0%, or 40.0%.

$Nb_2O_5$ is a component that contributes to a high refractive index and high dispersion. In addition, when the amount of $Nb_2O_5$ is set to the above-described range, thermal stability and the chemical durability of glass can be improved. On the other hand, when the amount of $Nb_2O_5$ is excessively large, the melting temperature of glass may rise, the thermal stability of glass may deteriorate, and coloration of glass tends to be enhanced. In addition, there is a concern that a specific gravity of glass may increase.

In the optical glass according to this embodiment, the amount of $Bi_2O_3$ is 20.0% or less. An upper limit of the amount of $Bi_2O_3$ is preferably 15.0%, and more preferably, may be 10.0%, 5.0%, 3.0%, 1.0%, or 0.1%. In addition, a lower limit of the amount of $Bi_2O_3$ may be 0%.

$Bi_2O_3$ is a glass component that raises the refractive index of glass. On the other hand, when the amount of $Bi_2O_3$ increases, the coloration of glass may increase. In addition, a high specific gravity may be caused. Accordingly, it is preferable that the amount of $Bi_2O_3$ is within the above-described range.

In the optical glass according to this embodiment, the total amount of $Al_2O_3$ and $SiO_2$ [$Al_2O_3$+$SiO_2$] is 2.0% or less. An upper limit of the total amount is preferably 1.8%, and more preferably, may be 1.5%, 1.3%, 1.0%, 0.8%, or 0.5%. In addition, a lower limit of the total amount may be 0%.

$Al_2O_3$ and $SiO_2$ are glass network forming components, and have an operation of improving the thermal stability, the chemical durability, and weather resistance of glass, increasing viscosity of molten glass, and allowing the molten glass to be easily molded. When the total amount increases, a desired refractive index may not be obtained.

In the optical glass according to this embodiment, the total amount of $Li_2O$, $Na_2O$, and $K_2O$ [$Li_2O$+$Na_2O$+$K_2O$] is 5.0% or less. An upper limit of the total amount is preferably 4.8%, and more preferably, may be 4.5%, 4.3%, or 4.0%. A lower limit of the total amount is preferably 0.1%, and more preferably, may be 0.5%, 1.0%, 1.5%, or 2.0%.

When the total amount [$Li_2O$+$Na_2O$+$K_2O$] is set to the above-described range, the thermal stability can be improved and the melting temperature can be lowered. On the other hand, when the total amount is excessively large, there is a concern that the chemical durability and the weather resistance may deteriorate. In addition, there is a concern that the refractive index may decrease.

In the optical glass according to this embodiment, the total amount of ZnO, SrO, and BaO [ZnO+SrO+BaO] is 0.01 to 12.0%. An upper limit of the total amount is preferably 11.5%, and more preferably, may be 11.0%, 10.5%, 10.0%, 9.5%, 9.0%, 8.5%, or 8.0%. A lower limit of the total amount is preferably 0.1%, and more preferably, may be 0.5%, 1.0%, 2.0%, 3.0%, 4.0%, or 5.0%.

Any of ZnO, SrO, and BaO is a glass component having an operation of lowering the melting temperature of glass, and improving the thermal stability and devitrification resistance. However, when the total amount [ZnO+SrO+BaO] increases, the desired refractive index may not be obtained, and the specific gravity also may increase. On the other hand, when the total amount is excessively small, there is a concern that the stability of glass may deteriorate.

In the optical glass according to this embodiment, with regard to amounts and ratios of glass components and properties, other than the above, a non-limiting example will be described below.

The optical glass according to this embodiment substantially does not contain fluorine (F). That is, in the optical glass according to this embodiment, an anion component is mainly oxygen (O). When being expressed in mass % with respect to a total substance amount of glass on the basis of oxides, the amount of F is preferably less than 1.0% in outer percentage, and more preferably in the order of 0.5% or less, 0.2% or less, and 0.1% or less in outer percentage.

Here, with regard to the F component, the "outer percentage" represents that a substance amount of the F component is expressed as mass % when all cation components constituting glass are assumed to be composed of oxides bonded with oxygen in charge balance, and when a substance amount of the entirety of glass composed of the oxides is set to 100%.

In the optical glass according to this embodiment, an upper limit of the amount of $SiO_2$ is preferably 2.0%, and more preferably, may be 1.8%, 1.5%, 1.3%, 1.0%, 0.8%, or 0.5%. The amount of $SiO_2$ may be 0%.

$SiO_2$ is a glass network forming component, and has an operation of improving the thermal stability, the chemical durability, and weather resistance of glass, increasing viscosity of molten glass, and allowing the molten glass to be easily molded. On the other hand, when the amount of $SiO_2$ is large, the desired refractive index is less likely to be obtained.

In the optical glass according to this embodiment, an upper limit of the amount of $B_2O_3$ is preferably 10.0%, and more preferably, may be 8.0%, 5.0%, 3.0%, or 1.0%. The amount of $B_2O_3$ may be 0%.

$B_2O_3$ is a glass network forming component. In addition, among glass network forming components, $B_2O_3$ contributes to a high refractive index. When the amount of $B_2O_3$ is set to the above-described range, the melting temperature can be controlled to an appropriate range, and the thermal stability of glass can be improved. On the other hand, when the amount of $B_2O_3$ is excessively large, the high refractive index may be hindered, and devitrification resistance tends to be lowered.

In the optical glass according to this embodiment, an upper limit of the amount of $Al_2O_3$ is preferably 2.0%, and more preferably, may be 1.8%, 1.5%, 1.3%, 1.0%, 0.8%, or 0.5%. The amount of $Al_2O_3$ may be 0%.

$Al_2O_3$ is a glass component having an operation of improving the chemical durability and the weather resistance of glass, and can also be considered as a network forming component. On the other hand, when the amount of $Al_2O_3$ increases, the desired refractive index is less likely to be obtained, and the melting temperature may rise, and the devitrification resistance of glass may deteriorate. In addition, a glass transition temperature Tg may rise, and a problem such as deterioration of the thermal stability is likely to occur.

In the optical glass according to this embodiment, an upper limit of the amount of $Li_2O$ is preferably 5.0%, and more preferably, may be 4.5%, 4.0%, 3.5%, 3.0%, or 2.5%. In addition, a lower limit of the amount of $Li_2O$ is preferably 0.01%, and more preferably, may be 0.02%, 0.03%, 0.04%, or 0.05%. The amount of $Li_2O$ may be 0%.

When the amount of $Li_2O$ is set to the above-described range, the melting temperature can be lowered and a low specific gravity can be obtained, and thus the thermal stability of glass can be improved. In addition, $Li_2O$ contributes to a high refractive index among alkali components. On the other hand, when the amount of $Li_2O$ is excessively large, the desired refractive index is less likely to be obtained, and there is a concern that the thermal stability, the chemical durability, and the weather resistance may deteriorate.

In the optical glass according to this embodiment, an upper limit of the amount of $Na_2O$ is preferably 5.0%, and more preferably, may be 4.5%, 4.0%, 3.5%, 3.0%, 2.5%, or 2.0%. In addition, a lower limit of the amount of $Na_2O$ is preferably 0%. The amount of $Na_2O$ may be 0%.

$Na_2O$ has an operation of lowering the melting temperature and improving the thermal stability of glass, and contributes to a low specific gravity, but when the amount is excessively large, the desired refractive index is less likely to be obtained.

In the optical glass according to this embodiment, an upper limit of the amount of $K_2O$ is preferably 5.0%, and more preferably, may be 4.8%, 4.5%, 4.3%, 4.0%, 3.8%, or 3.5%. In addition, a lower limit of the amount of $K_2O$ is preferably 0.1%, and more preferably, may be 0.3%, 0.5%, 0.8%, 1.0%, or 1.5%.

$K_2O$ has an operation of lowering the melting temperature and improving the thermal stability of glass, and contributes to a low specific gravity, but when the amount is excessively large, the desired refractive index is less likely to be obtained.

In the optical glass according to this embodiment, an upper limit of the amount of $Cs_2O$ is preferably 10.0%, and more preferably, may be 8.0%, 5.0%, 3.0%, 1.0%, 0.5%, or 0.1%. In addition, a lower limit of the amount of $Cs_2O$ is preferably 0%.

$Cs_2O$ has an operation of lowering the melting temperature and improving the thermal stability of glass, and contributes to a low specific gravity, but when the amount is excessively large, the desired refractive index is less likely to be obtained.

In the optical glass according to this embodiment, an upper limit of the amount of MgO is preferably 15.0%, and more preferably, may be 10.0%, 8.0%, 5.0%, or 3.0%. In addition, the amount of MgO may be 0%. MgO is a glass component having an operation of lowering the melting temperature of glass, and improving the thermal stability and the devitrification resistance. However, when the amount of MgO increases, the desired refractive index is less likely to be obtained, and the thermal stability and the devitrification resistance of glass may deteriorate.

In the optical glass according to this embodiment, an upper limit of the amount of CaO is preferably 15.0%, and more preferably, may be 10.0%, 8.0%, 5.0%, or 3.0%. In addition, the amount of CaO may be 0%. CaO is a glass component having an operation of lowering the melting temperature of glass, and improving the thermal stability and the devitrification resistance. However, when the amount of CaO increases, the desired refractive index is less likely to be obtained, and the thermal stability and the devitrification resistance of glass may deteriorate.

In the optical glass according to this embodiment, an upper limit of the amount of SrO is preferably 12.0%, and more preferably, may be 10.0%, 8.0%, 5.0%, or 3.0%. In addition, a lower limit of the amount of SrO is preferably 0%. SrO is a glass component having an operation of lowering the melting temperature of glass, and improving the thermal stability and the devitrification resistance. However, when the amount of SrO increases, the specific gravity may increase, the desired refractive index is less likely to be obtained, and the thermal stability and the devitrification resistance of glass may deteriorate.

In the optical glass according to this embodiment, an upper limit of the amount of BaO is preferably 12.0%, and more preferably, may be 11.5%, 11.0%, 10.5%, 10.0%, 9.5%, 9.0%, 8.5%, or 8.0%. In addition, a lower limit of the amount of BaO is preferably 0.1%, and more preferably, may be 0.5%, 1.0%, 2.0%, 3.0%, 4.0%, or 5.0%. BaO is a glass component having an operation of lowering the melting temperature of glass, and improving the thermal stability and the devitrification resistance. However, when the amount of BaO increases, the specific gravity may increase, the desired refractive index is less likely to be obtained, and the thermal stability and the devitrification resistance of glass may deteriorate.

In the optical glass according to this embodiment, an upper limit of the amount of ZnO is preferably 12.0%, and more preferably, may be 10.0%, 8.0%, 5.0%, or 3.0%. In addition, a lower limit of the amount of ZnO is preferably 0%. ZnO is a glass component having an operation of lowering the melting temperature of glass, and improving the thermal stability and the devitrification resistance. However, when the amount of ZnO increases, the specific gravity may increase, the desired refractive index is less likely to be obtained, and the thermal stability and the devitrification resistance of glass may deteriorate.

In the optical glass according to this embodiment, an upper limit of the amount of $ZrO_2$ is preferably 10.0%, and more preferably, may be 8.0%, 5.0%, 3.0%, 1.0%, 0.5%, or 0.1%. In addition, a lower limit of the amount of $ZrO_2$ is preferably 0%. $ZrO_2$ is a glass component having an operation of raising the refractive index of glass, and improving the thermal stability and the devitrification resistance. However, when the amount of $ZrO_2$ is excessively large, the specific gravity may increase, the melting temperature may rise, and the thermal stability tends to deteriorate.

In the optical glass according to this embodiment, an upper limit of the amount of $WO_3$ is preferably 15.0%, and more preferably, may be 13.0%, 10.0%, 8.0%, 5.0%, 3.0%, or 1.0%. The amount of $WO_3$ may be 0%. $WO_3$ is a glass component that raises a refractive index of glass. However, when the amount of $WO_3$ is excessively large, the specific gravity may increase, and the thermal stability tends to deteriorate.

In the optical glass according to this embodiment, an upper limit of the amount of $Ta_2O_5$ is preferably 10.0%, and more preferably, may be 8.0%, 5.0%, 3.0%, 1.0%, 0.5%, or 0.1%. In addition, a lower limit of the amount of $Ta_2O_5$ is preferably 0%. $Ta_2O_5$ is a glass component that raises the refractive index of glass. However, when the amount of $Ta_2O_5$ increases, the specific gravity of glass may increase, the thermal stability of glass may deteriorate, and the melting temperature of glass may rise.

In the optical glass according to this embodiment, an upper limit of the amount of $La_2O_3$ is preferably 10.0%, and more preferably, may be 8.0%, 5.0%, 3.0%, 1.0%, 0.5%, or 0.1%. In addition, a lower limit of the amount of $La_2O_3$ is preferably 0%. $La_2O_3$ is a glass component that raises the refractive index of glass. However, when the amount of $La_2O_3$ increases, the specific gravity of glass may increase, the thermal stability of glass may deteriorate, and the melting temperature of glass may rise.

In the optical glass according to this embodiment, an upper limit of the amount of $Y_2O_3$ is preferably 10.0%, and more preferably, may be 8.0%, 5.0%, 3.0%, 1.0%, 0.5%, or 0.1%. In addition, a lower limit of the amount of $Y_2O_3$ is preferably 0%. $Y_2O_3$ is a glass component that raises the refractive index of glass. However, when the amount of $Y_2O_3$ increases, the specific gravity of glass may increase, the thermal stability of glass may deteriorate, and the melting temperature of glass may rise.

In the optical glass according to this embodiment, an upper limit of the amount of $Gd_2O_3$ is preferably 10.0%, and more preferably, may be 8.0%, 5.0%, 3.0%, 1.0%, 0.5%, or 0.1%. In addition, a lower limit of the amount of $Gd_2O_3$ is preferably 0%. $Gd_2O_3$ is a glass component that raises the refractive index of glass. However, when the amount of $Gd_2O_3$ increases, the specific gravity of glass may increase, the thermal stability of glass may deteriorate, and the melting temperature of glass may rise.

In the optical glass according to this embodiment, an upper limit of the amount of $Lu_2O_3$ is preferably 10.0%, and more preferably, may be 8.0%, 5.0%, 3.0%, 1.0%, 0.5%, or 0.1%. In addition, a lower limit of the amount of $Lu_2O_3$ is preferably 0%. $Lu_2O_3$ is a glass component that raises the refractive index of glass. However, when the amount of $Lu_2O_3$ increases, the specific gravity of glass may increase.

In the optical glass according to this embodiment, an upper limit of the amount of $Yb_2O_3$ is preferably 10.0%, and more preferably, may be 8.0%, 5.0%, 3.0%, 1.0%, 0.5%, or 0.1%. In addition, a lower limit of the amount of $Yb_2O_3$ is preferably 0%. $Yb_2O_3$ is a glass component that raises the refractive index of glass. However, when the amount of $Yb_2O_3$ increases, the specific gravity of glass may increase.

In the optical glass according to this embodiment, an upper limit of the amount of $GeO_2$ is preferably 10.0%, and more preferably, may be 8.0%, 5.0%, 3.0%, 1.0%, 0.5%, or 0.1%. In addition, a lower limit of the amount of $GeO_2$ is preferably 0%. $GeO_2$ is a component that has an operation of raising a refractive index nd, and is very expensive component among glass components which are typically used. Accordingly, from the viewpoint of reducing the production cost of glass, it is preferable that the amount of $GeO_2$ is within the above-described range.

In the optical glass according to this embodiment, an upper limit of the amount of $HfO_2$ is preferably 10.0%, and more preferably, may be 8.0%, 5.0%, 3.0%, 1.0%, 0.5%, or 0.1%. In addition, a lower limit of the amount of $HfO_2$ is preferably 0%. $HfO_2$ is a component that has an operation of raising the refractive index nd and increasing the specific gravity, and is expensive. Accordingly, from the viewpoint of reducing the production cost of glass, it is preferable that the amount of $HfO_2$ is within the above-described range.

In the optical glass according to this embodiment, an upper limit of the amount of $In_2O_3$ is preferably 10.0%, and more preferably, may be 8.0%, 5.0%, 3.0%, 1.0%, 0.5%, or 0.1%. In addition, a lower limit of the amount of $In_2O_3$ is preferably 0%. $In_2O_3$ is a component that has an operation of raising the refractive index nd and increasing the specific gravity, and is expensive. Accordingly, from the viewpoint of reducing the production cost of glass, it is preferable that the amount of $In_2O_3$ is within the above-described range.

In the optical glass according to this embodiment, an upper limit of the amount of $Ga_2O_3$ is preferably 10.0%, and more preferably, may be 8.0%, 5.0%, 3.0%, 1.0%, 0.5%, or 0.1%. In addition, a lower limit of the amount of $Ga_2O_3$ is preferably 0%. $Ga_2O_3$ is a component that has an operation of raising the refractive index nd and increasing the specific gravity, and is expensive. Accordingly, from the viewpoint of reducing the production cost of glass, it is preferable that the amount of $Ga_2O_3$ is within the above-described range.

In the optical glass according to this embodiment, an upper limit of the amount of $Sc_2O_3$ is preferably 10.0%, and more preferably, may be 8.0%, 5.0%, 3.0%, 1.0%, 0.5%, or 0.1%. In addition, a lower limit of the amount of $Sc_2O_3$ is preferably 0%. $Sc_2O_3$ has an operation of raising the refractive index nd, and increases the specific gravity. Accordingly, from the viewpoint of reducing the specific gravity of glass, it is preferable that the amount of $Sc_2O_3$ is within the above-described range.

In the optical glass according to this embodiment, an upper limit of the total amount of $P_2O_5$, $TiO_2$, and $Nb_2O_5$ [$P_2O_5$+$TiO_2$+$Nb_2O_5$] is preferably 98.0%, and more preferably, may be 97.0%, 96.0%, or 95.0%. In addition, a lower limit of the total amount is preferably 70.0%, and more preferably, may be 73.0%, 75.0%, 78.0%, or 80.0%. When the total amount [$P_2O_5$+$TiO_2$+$Nb_2O_5$] is within the above-described range, the melting temperature may be lowered, and the stability of glass may be improved.

In the optical glass according to this embodiment, an upper limit of the total amount of SrO and BaO [SrO+BaO] is preferably 12.0%, and more preferably, may be 11.5%, 11.0%, 10.5%, 10.0%, 9.5%, 9.0%, 8.5%, or 8.0%. A lower limit of the total amount is preferably 0.1%, and more preferably, may be 0.5%, 1.0%, 2.0%, 3.0%, 4.0%, or 5.0%. Any of these components has an operation of improving the thermal stability of glass. However, the total amount [SrO+BaO] increases, the specific gravity may increase, and the desired refractive index may not be obtained.

In the optical glass according to this embodiment, an upper limit of the total amount of MgO, CaO, ZnO, SrO, and BaO [MgO+CaO+ZnO+SrO+BaO] is preferably 12.0%, and more preferably, may be 11.5%, 11.0%, 10.5%, 10.0%, 9.5%, 9.0%, 8.5%, or 8.0%. A lower limit of the total amount is preferably 0.1%, and more preferably, may be 0.5%, 1.0%, 2.0%, 3.0%, 4.0%, or 5.0%. Any of these components has an operation of lowering the melting temperature of glass and improving the thermal stability. However, when the total amount [MgO+CaO+ZnO+SrO+BaO] increases, a desired refractive index may not be obtained.

In the optical glass according to this embodiment, an upper limit of the total amount of $Li_2O$, $Na_2O$, $K_2O$, MgO, CaO, ZnO, SrO, and BaO [$Li_2O$+$Na_2O$+$K_2O$+MgO+CaO+ZnO+SrO+BaO] is preferably 17.0%, and more preferably, may be 16.0%, 15.0%, 14.0%, 13.0%, 12.0%, 11.0%, or 10.0%. In addition, a lower limit of the total amount is preferably 0.5%, and more preferably, may be 1.0%, 1.5%, 2.0%, 2.5%, 3.0%, 3.5%, 4.0%, or 4.5%. Any of these components has an operation of lowering the melting temperature of glass, and improving the thermal stability. However, when the total amount [$Li_2O$+$Na_2O$+$K_2O$+MgO+CaO+ZnO+SrO+BaO] increases, the desired refractive index may not be obtained.

In the optical glass according to this embodiment, an upper limit of the total amount of $TiO_2$ and $Nb_2O_5$ [$TiO_2$+$Nb_2O_5$] is preferably 80.0%, and more preferably, may be 78.0%, 75.0%, 73.0%, or 70.0%. A lower limit of the total amount is preferably 40.0%, and more preferably, may be 43.0%, 45.0%, 48.0%, 50.0%, 53.0%, or 55.0%. When the total amount [$TiO_2$+$Nb_2O_5$] is within the above-described range, a high refractive index may be obtained, and stability of glass may be improved.

In the optical glass according to this embodiment, an upper limit of the total amount of $TiO_2$, $Nb_2O_5$, $WO_3$, and $Bi_2O_3$[$TiO_2$+$Nb_2O_5$+$WO_3$+$Bi_2O_3$] is preferably 80.0%, and more preferably, may be 78.0%, 75.0%, 73.0%, or 70.0%. In addition, a lower limit of the total amount is preferably 40.0%, and more preferably, may be 43.0%, 45.0%, 48.0%, 50.0%, 53.0%, or 55.0%. When the total amount [$TiO_2$+$Nb_2O_5$+$WO_3$+$Bi_2O_3$] is set to the above-described range, a high refractive index may be obtained, the stability of glass may be improved.

In the optical glass according to this embodiment, an upper limit of a mass ratio [$P_2O_5$/($P_2O_5$+$TiO_2$+$Nb_2O_5$)] between the amount of $P_2O_5$ and the total amount of $P_2O_5$, $TiO_2$, and $Nb_2O_5$ [$P_2O_5$+$TiO_2$+$Nb_2O_5$] is preferably 0.40, and more preferably, may be 0.38, 0.35, 0.33, or 0.30. A lower limit of the mass ratio is 0.15, and may be 0.18, 0.20, or 0.23. When the mass ratio is within the above-described range, a desired refractive index is likely to be obtained, and the stability of glass may be improved.

In the optical glass according to this embodiment, a mass ratio [$K_2O$/($Li_2O$+$Na_2O$+$K_2O$)] between the amount of $K_2O$ and a total amount of $Li_2O$, $Na_2O$, and $K_2O$ [$Li_2O$+$Na_2O$+$K_2O$] is preferably more than 0, and more preferably, a lower limit of the mass ratio may be 0.10, 0.20, 0.30, 0.40, or 0.50. When the mass ratio is within the above-described range, the stability of glass may be improved.

In the optical glass according to this embodiment, an upper limit of a mass ratio [$TiO_2$/([$Li_2O$+$Na_2O$+$K_2O$])] between the amount of $TiO_2$ and the total amount of $Li_2O$, $Na_2O$, and $K_2O$ [$Li_2O$+$Na_2O$+$K_2O$] is preferably 500, and more preferably, may be 450, 400, or 300. A lower limit of the mass ratio is preferably 1.0, and more preferably, may be 1.5, 2.0, 2.5, or 3.0. In addition, when the mass ratio is within the above-described range, a desired refractive index is likely to be obtained, and the stability of glass may be improved.

In the optical glass according to this embodiment, an upper limit of a mass ratio [(MgO+CaO+ZnO+SrO+BaO)/($Li_2O$+$Na_2O$+$K_2O$)] between the total amount of MgO, CaO, ZnO, SrO, and BaO [MgO+CaO+ZnO+SrO+BaO], and the total amount of $Li_2O$, $Na_2O$, and $K_2O$ [$Li_2O$+$Na_2O$+$K_2O$] is preferably 300, and more preferably, may be 250, 200, or 150. In addition, a lower limit of the mass ratio is preferably 0.10, and more preferably, may be 0.20, 0.30, 0.40, or 0.50. When the mass ratio is within the above-described range, the stability of glass may be improved.

In the optical glass according to this embodiment, a mass ratio [BaO/([MgO+CaO+ZnO+SrO+BaO])] between the amount of BaO and the total amount of MgO, CaO, ZnO, SrO, and BaO [MgO+CaO+ZnO+SrO+BaO] is preferably more than 0, and more preferably, a lower limit of the mass ratio may be 0.1, 0.2, 0.3, 0.4, or 0.5. When the mass ratio is within the above-described range, the stability of glass may be improved.

In the optical glass according to this embodiment, an upper limit of a mass ratio [$TiO_2$/(MgO+CaO+ZnO+SrO+BaO)] between the amount of $TiO_2$ and the total amount of MgO, CaO, ZnO, SrO, and BaO [MgO+CaO+ZnO+SrO+BaO] is preferably 50.0, and more preferably, may be 45.0, 40.0, 35.0, or 30.0. A lower limit of the mass ratio is preferably 0.1, and more preferably, may be 0.3, 0.5, 0.8, or 1.0. In addition, when the mass ratio is within the above-described range, a low specific gravity and a desired refractive index are likely to be obtained, and the stability of glass may be improved.

In the optical glass according to this embodiment, an upper limit of a mass ratio [$TiO_2$/($TiO_2$+$Nb_2O_5$)] between the amount of $TiO_2$ and the total amount of $TiO_2$ and $Nb_2O_5$[$TiO_2$+$Nb_2O_5$] is preferably 0.60, and more preferably, may be 0.58, 0.55, 0.53, 0.50, 0.48, or 0.45. In addition, a lower limit of the mass ratio is preferably 0.10, and more preferably, may be 0.13, 0.15, 0.18, or 0.20. Any of $TiO_2$ and $Nb_2O_5$ is a glass component that contributes to a high refractive index and high dispersibility, but becomes the cause for an increase in the specific gravity. $TiO_2$ further contributes to the high refractive index in comparison to $Nb_2O_5$ but is less likely to increase the specific gravity of glass. Accordingly, in the embodiment of the present invention, when the mass ratio [$TiO_2$/($TiO_2$+$Nb_2O_5$)] is set to the above-described range, an optical glass in which the refractive index is high, the stability is high, and the specific gravity is small may be obtained.

In the optical glass according to this embodiment, an upper limit of a mass ratio [$TiO_2$/($TiO_2$+$Nb_2O_5$+$WO_3$+$Bi_2O_3$)] between the amount of $TiO_2$ and the total amount of $TiO_2$, $Nb_2O_5$, $WO_3$, and $Bi_2O_3$ is preferably 0.60, and more preferably, may be 0.58, 0.55, 0.53, 0.50, 0.48, or 0.45. A lower limit of the mass ratio is preferably 0.10, and more preferably, may be 0.13, 0.15, 0.18, or 0.20. Any of $TiO_2$, $Nb_2O_5$, $WO_3$, and $Bi_2O_3$ is a glass component that contributes to a high refractive index and high dispersibility, but becomes the cause for an increase in the specific gravity. $TiO_2$ further contributes to the high refractive index in comparison to $Nb_2O_5$, $WO_3$, and $Bi_2O_3$, and is less likely to increase the specific gravity of glass. Accordingly, in the embodiment of the present invention, when mass ratio [$TiO_2$/($TiO_2$+$Nb_2O_5$+$WO_3$+$Bi_2O_3$)] is set to the above-described range, an optical glass in which the refractive index is high and the specific gravity is small may be obtained.

In the optical glass according to this embodiment, an upper limit of a mass ratio [$TiO_2$/$Nb_2O_5$] between the amount of $TiO_2$ and the amount of $Nb_2O_5$ is preferably 2.0, and more preferably, may be 1.8, 1.5, 1.3, 1.0, or 0.8. In addition, a lower limit of the mass ratio is preferably 0.10, and more preferably, may be 0.13, 0.15, 0.18, or 0.20. Any of $TiO_2$ and $Nb_2O_5$ is a glass component that contributes a high refractive index and high dispersibility, but becomes the cause for an increase in the specific gravity. $TiO_2$ further contributes to the high refractive index in comparison to $Nb_2O_5$, and is less likely to increase the specific gravity of glass. Accordingly, in the embodiment of the present invention, when the mass ratio [$TiO_2$/$Nb_2O_5$] is set to the above-described range, an optical glass in which the refractive index is high, the stability is high, and the specific gravity is small may be obtained.

In the optical glass according to this embodiment, an upper limit of a mass ratio [$TiO_2$/($Nb_2O_5$+$WO_3$+$Bi_2O_3$)] between the amount of $TiO_2$ and the total amount of $Nb_2O_5$, $WO_3$, and $Bi_2O_3$ is preferably 2.0, and more preferably, may be 1.8, 1.5, 1.3, 1.0, or 0.8. A lower limit of the mass ratio is preferably 0.10, and more preferably, may be 0.13, 0.15, 0.18, or 0.20. Any of $TiO_2$, $Nb_2O_5$, $WO_3$, and $Bi_2O_3$ is a glass component that contributes a high refractive index and high dispersibility, but becomes the cause for an increase in the specific gravity. $TiO_2$ further contributes to the high refractive index in comparison to $Nb_2O_5$, $WO_3$, and $Bi_2O_3$, and is less likely to increase the specific gravity of glass. Accordingly, in the embodiment of the present invention, when the mass ratio [$TiO_2$/($Nb_2O_5$+$WO_3$+$Bi_2O_3$)] is set to the above-described range, an optical glass in which the refractive index is high, the stability is high, and the specific gravity is small may be obtained.

In the optical glass according to this embodiment, an upper limit of a mass ratio [($Li_2O$+$Na_2O$+MgO+CaO+ZnO+SrO)/($K_2O$+BaO)] between a total amount of $Li_2O$, $Na_2O$, MgO, CaO, ZnO, and SrO [$Li_2O$+$Na_2O$+MgO+CaO+ZnO+SrO], and a total amount of $K_2O$ and BaO [$K_2O$+BaO] is preferably 10.0, and more preferably, may be 8.0, 5.0, 3.0, 1.0, or 0.8. When the mass ratio [($Li_2O$+$Na_2O$+MgO+CaO+ZnO+SrO)/($K_2O$+BaO)] is set to the above-described range, optical glass with high stability may be obtained.

In the optical glass according to this embodiment, an upper limit of a mass ratio [($TiO_2$+$Nb_2O_5$)/($SiO_2$+$B_2O_3$+$Li_2O$+$Na_2O$+$K_2O$+MgO+CaO+ZnO+SrO+BaO)] between the total amount of $TiO_2$ and $Nb_2O_5$ [$TiO_2$+$Nb_2O_5$] and the total amount of $SiO_2$, $B_2O_3$, $Li_2O$, $Na_2O$, $K_2O$, MgO, CaO, ZnO, SrO, and BaO [$SiO_2$+$B_2O_3$+$Li_2O$+$Na_2O$+$K_2O$+MgO+CaO+ZnO+SrO+BaO] is preferably 20.0, and more preferably, may be 18.0, 15.0, 13.0, or 10.0. A lower limit of the mass ratio is preferably 0.5, and more preferably, may be 1.0, 1.5, 2.0, 2.5, 3.0, 3.5, or 4.0. When the mass ratio [($TiO_2$+$Nb_2O_5$)/($SiO_2$+$B_2O_3$+$Li_2O$+$Na_2O$+$K_2O$+MgO+CaO+ZnO+SrO+BaO)] is set to the above-described range, an optical glass in which the refractive index is high and the stability is high may be obtained.

<Other Component Compositions>

Any of Pb, As, Cd, Ti, Be, Se, and Te has toxicity. Therefore, it is preferable that the optical glass according to this embodiment does not contain these elements as a glass component.

Any of U, Th, and Ra is a radioactive element. Therefore, it is preferable that the optical glass according to this embodiment does not contain these elements as a glass component.

V, Cr, Mn, Fe, Co, Ni, Cu, Pr, Nd, Pm, Sm, Eu, Tb, Dy, Ho, Er, and Tm increase coloration of glass, and may become a generation source of fluorescence. Therefore, it is preferable that the optical glass according to this embodiment does not contain these elements as a glass component.

Sb ($Sb_2O_3$), Ce ($CeO_2$), and Sn ($SnO_2$) are elements which function as a clarification agent and can be arbitrarily added. Among these, Sb ($Sb_2O_3$) is a clarification agent having a high clarification effect. The clarification effect of Ce ($CeO_2$) is lower than that of Sb ($Sb_2O_3$). When a large amount of Ce ($CeO_2$) is added, coloration of glass tends to increase.

Note that, in this specification, the amounts of Sb ($Sb_2O_3$), Ce ($CeO_2$), and Sn ($SnO_2$) are expressed in outer percentage, and are not included in the total amount of all glass components expressed on the basis of oxides. That is, in this specification, the total amount of all glass components except for Sb ($Sb_2O_3$), Ce ($CeO_2$), and Sn ($SnO_2$) is set to 100 mass %.

The amount of $Sb_2O_3$ is expressed in outer percentage. That is, when the total amount of all glass components except for $Sb_2O_3$, $CeO_2$, and $SnO_2$ is set to 100 mass %, the amount of $Sb_2O_3$ is preferably 1.0% or less, and more preferably in the order of 0.5% or less, 0.1% or less, 0.08% or less, 0.06% or less, 0.04% or less, and 0.02% or less. The amount of $Sb_2O_3$ may be 0%.

The amount of $CeO_2$ is also expressed in outer percentage. That is, when the total amount of all glass components except for $Sb_2O_3$, $CeO_2$, and $SnO_2$ is set to 100 mass %, the amount of $CeO_2$ is preferably 2.0% or less, and more preferably in the order of 1.0% or less, 0.5% or less, and 0.1% or less. The amount of $CeO_2$ may be 0%. When the amount of $CeO_2$ is set to the above-described range, a clarification property of glass can be improved.

The amount of $SnO_2$ is also expressed in outer percentage. That is, when the total amount of all glass components except for $Sb_2O_3$, $CeO_2$, and $SnO_2$ is set to 100 mass %, the amount of $SnO_2$ is preferably 2.0% or less, and more preferably in the order of 1.0% or less, 0.5% or less, and 0.1% or less. The amount of $SnO_2$ may be 0%. When the amount of $SnO_2$ is set to the above-described range, the clarification property of glass can be improved.

<Properties of Glass>

The refractive index nd of the optical glass according to this embodiment is 1.950 or more. It is preferable that the optical glass according to this embodiment has the following properties in addition to the high refractive index property.

(Abbe Number)

In the optical glass according to this embodiment, a lower limit of an Abbe number νd for obtaining desired dispersibility is preferably 15.0, and more preferably, may be 15.5, 16.0, or 16.5. In addition, an upper limit of the Abbe number νd is preferably 20.0, and more preferably, may be 19.5, 19.0, 18.5, or 18.0.

(Specific Gravity)

The optical glass according to this embodiment is high-refractive-index glass, and the specific gravity is not large. When the specific gravity of glass can be reduced, the weight of a lens can be reduced. On the other hand, when the specific gravity is excessively small, deterioration of the thermal stability may be caused.

Accordingly, in the optical glass according to this embodiment, an upper limit of the specific gravity is preferably 4.20, and more preferably, may be 4.15, 4.10, 4.05, 4.00, 3.95, 3.90, 3.85, or 3.80.

(Ratio Between Refractive Index nd and Specific Gravity d)

In the optical glass according to this embodiment, a lower limit of a ratio (nd/d) between the refractive index nd and the specific gravity d is preferably 0.48, and more preferably, may be 0.49, 0.50, 0.51, or 0.52. An upper limit of the ratio (nd/d) is preferably 0.60, and more preferably, may be 0.59, 0.58, or 0.57. When the refractive index nd and the specific gravity d satisfy the above-described range, an optical glass in which the refractive index is high and the specific gravity is relatively reduced may be obtained.

(Glass Transition Temperature Tg)

In the optical glass according to this embodiment, an upper limit of a glass transition temperature Tg is preferably 800° C. from the viewpoint of lowering a slow cooling temperature of glass, a heating and softening temperature, or a pressing temperature, and more preferably, may be 780° C., 750° C., 730° C., or 700° C. A lower limit of the glass transition temperature Tg is not particularly limited, but the lower limit is typically 380° C. Note that, from the viewpoint of suppressing cracks of glass by further strengthening a glass network structure, or from the viewpoint of decreasing thermal expansion of glass and enhancing heat resistance of glass, a lower limit of the glass transition temperature Tg is preferably 390° C., and more preferably, may be 400° C., 410° C., 420° C., 430° C., or 440° C. Particularly, to enhance the heat resistance of glass having a high refractive index, a lower limit of the glass transition temperature Tg is preferably set to 460° C., and more preferably, may be 480° C., 500° C., 510° C., 520° C., 530° C., or 535° C. The glass transition temperature Tg can be controlled by mainly adjusting the amounts of Li, Na, and K or the total amount thereof, the amount of Zn, or the like.

(Degrees of Coloration λ70 and λ5)

A light beam transmitting property of the optical glass according to this embodiment can also be evaluated by the degrees of coloration λ70 and λ5.

With respect to a glass sample having a thickness of 10.0 mm±0.1 mm, a spectral transmittance is measured in a wavelength range of 200 to 700 nm, a wavelength at which an external transmittance is 70% is set as λ70, and a wavelength at which the external transmittance is 5% is set as λ5.

An upper limit of 170 of the optical glass according to this embodiment is preferably 650 nm, and more preferably, may be 640 nm, 630 nm, 620 nm, 610 nm, or 600 nm. An upper limit of λ5 is preferably 450 nm, and more preferably, may be 440 nm, 430 nm, 420 nm, 410 nm, or 400 nm.

<Production of Optical Glass>

The optical glass according to the embodiment of the present invention may be prepared by combining glass raw materials to be the above-described predetermined refractive index and composition, and by using the combined glass raw materials in accordance with a known glass production method. For example, a plurality of kinds of compounds are combined and are sufficiently mixed to obtain a batch raw material, and the batch raw material is put into a quartz crucible or a platinum crucible and is roughly melted. The molten product obtained by the rough melting is quickly cooled and is pulverized to prepare a cullet. Furthermore, the cullet is put into a platinum crucible, and is heated and remelted to obtain molten glass. The molten glass is molded after clarification and homogenization, and is slowly cooled to obtain an optical glass. In the molding and slow cooling of the molten glass, a known method may be applicable.

Note that, compounds which are used when combining the batch raw material are not particularly limited as long as desired glass components can be introduced into the glass to be desired amounts, but examples of the compounds include oxides, carbonates, nitrates, hydroxides, fluorides, and the like.

<Production of Optical Element or the Like>

A known method may be applicable for producing an optical element by using the optical glass according to the embodiment of the present invention. For example, glass raw materials are melted to obtain molten glass, and the molten glass is cast into a mold and is molded into a plate shape, thereby preparing a glass material including the optical glass according to the present invention. The obtained glass material is appropriately cut, grinded, and polished to prepare a cut piece having a size and a shape suitable for press molding. The cut piece is heated, softened, and press molded (reheat press) by a known method, thereby preparing an optical element blank that approximates a shape of the optical element. The optical element blank is annealed, and is grinded and polished by a known method, thereby preparing an optical element.

An optical functional surface of the prepared optical element may be coated with an antireflection film, a total reflection film, or the like in correspondence with the purpose of use.

According to an aspect of the present invention, an optical element including the optical glass can be provided. Examples of the kind of the optical element include a lens such as a planar lens, spherical lens, and an aspherical lens, a prism, a diffraction grating, a light guide plate, and the like. Examples of a shape of the lens include various shapes such as a biconvex lens, a plano-convex lens, a biconcave lens, a plano-concave lens, a convex meniscus lens, and a concave meniscus lens. Examples of the application of the light guide plate include display devices such as eyeglass-type device in an augmented reality (AR) display type, an eyeglass-type device in a mixed reality (MR) display type, and the like. The light guide plate is plate-shaped glass that is attached to a frame of the eyeglass-type device, and includes the optical glass. A diffraction grating configured to change an advancing direction of a light beam that propagates through the inside of the light guide plate while repeating total reflection may be formed on a surface of the light guide plate as necessary. The diffraction grating can be formed by a known method. When wearing the eyeglass-type device including the light guide plate, the light beam that propagates through the inside of the light guide plate is incident on pupils, and a function of augmented reality (AR) display or mixed reality (MR) display can be exhibited. The eyeglass-type device is disclosed, for example, in JP Patent Application Laid Open (Translation of PCT Application) No. 2017-534352, and the like. Note that, the light guide plate can be prepared by a known method. The optical element can be produced by a method including a process of processing a glass molded body including the optical glass. Examples of the processing include severing, cutting, rough grinding, fine grinding, polishing, and the like. At the time of performing the processing, if the glass according to the present invention is used, breakage can be reduced, and a high-quality optical element can be stably supplied.

<Image Display Device>

A light guide plate that is an aspect of the present invention, and an image display device using the light guide plate will be described in detail with reference to the accompanying drawings. Note that, the same reference numeral will be given the same or equivalent portion, and description thereof will not be repeated.

FIGS. 1A and 1B are views illustrating a configuration of a head-mounted display 1 (hereinafter, abbreviated as "HMD 1") using a light guide plate 10 that is an aspect of the present invention. FIG. 1A is a front side perspective view of the HMD 1, and FIG. 1B is a rear side perspective view of the HMD 1. As illustrated in FIG. 1A and FIG. 1B, an eyeglass lens 3 is attached to a front portion of an eyeglass type frame 2 mounted on the head of a user. A backlight 4 that illuminates an image is attached to an attachment portion 2*a* of the eyeglass type frame 2. A signal processing device 5 that projects an image and a speaker 6 that reproduces a voice are provided in a temple portion of the eyeglass type frame 2. A flexible printed circuit (FPC) 7 that constitutes an interconnection led-out from a circuit of the signal processing device 5 is wired to the eyeglass type frame 2. A display element unit (for example, a liquid crystal display element) 20 is wired to the central position of user's eyes by the FPC 7, and is held so that approximately the central portion of the display element unit 20 is disposed on an optical axial line of the backlight 4. The display element unit 20 is relatively fixed to a light guide plate 10 to be located at approximately the central portion of the light guide plate 10. In addition, holographic optical elements (HOEs) 32R and 32L (first optical elements) are tightly fixed onto a first surface 10*a* of the light guide plate 10 at sites in front of user's eyes by adhesion or the like. HOEs 52R and 52L are staked on a second surface 10*b* of the light guide plate 10 at a position facing the display element unit 20 with the light guide plate 10 interposed therebetween.

FIG. 2 is a side view schematically illustrating the configuration of the HMD 1 that is an aspect of the present invention. Note that, in FIG. 2, only main parts of an image display device are illustrated for clarifying the drawing, and illustration of the eyeglass type frame 2 and the like is omitted. As illustrated in FIG. 2, the HMD 1 has a structure that is laterally symmetric to a central line X connecting the center of an image display element 24 and the center of the light guide plate 10. In addition, light beams of respective wavelengths which are incident from the image display element 24 onto the light guide plate 10 are divided into two parts to be guided to a right eye and a left eye of a user, respectively, as to be described later. Optical paths of the light beams of respective wavelengths which are guided to the eyes are also approximately laterally symmetric to the central line X.

As illustrated in FIG. 2, the backlight 4 includes a laser light source 21, a diffusion optical system 22, and a microlens array 23. The display element unit 20 is an image generation unit including the image display element 24, and is driven, for example, in a field sequential method. The laser light source 21 includes laser light sources corresponding to respective wavelengths of R (wavelength: 436 nm), G (wavelength: 546 nm), and B (wavelength: 633 nm), and sequentially emits light beams of respective wavelengths at a high speed. The light beams of respective wavelengths are incident on the diffusion optical system 22 and the microlens array 23, are converted into a uniform high-directivity parallel luminous flux without unevenness in a light quantity, and are vertically incident on a display panel surface of the image display element 24.

For example, the image display element 24 is a transmissive liquid crystal (LCDT-LCOS) panel that is driven in a field sequential type. The image display element 24 modulates light beams of respective wavelengths in correspondence with an image signal that is generated by an image engine (not illustrated) of the signal processing device 5. The light beams of respective wavelengths which are modulated in a pixel of an effective region of the image display element 24 are incident on the light guide plate 10 with a predetermined luminous flux cross-section (approximately the same shape as in the effective region). Note that, for example, the image display element 24 may be substituted with a different type display element such as a digital mirror device (DMD), reflective liquid crystal (LCOS) panel, micro electro mechanical systems (MEMS), organic electro-luminescence (EL), and inorganic EL.

Note that, the display element unit 20 may be set as an image generation unit of a simultaneous display element (a display element including a predetermined array of RGB color filters on the front surface of an emission surface) without limitation to the field sequential type display element. In this case, as the light source, for example, a white light source is used.

As illustrated in FIG. 2, light beams of respective wavelengths which are modulated by the image display element 24 are sequentially incident on the inside of the light guide plate 10 from the first surface 10*a*. HOEs 52R and 52L (second optical elements) are stacked on the second surface 10*b* of the light guide plate 10. For example, the HOEs 52R and 52L are rectangular reflective volume phase type HOEs, and have a configuration obtained by stacking three sheets of photopolymers on each of which interference fringes corresponding to light beams of respective wavelengths of R, G, and B are recorded. That is, the HOEs 52R and 52L are configured to have a wavelength selection function of diffracting the light beams of respective wavelengths of R, G, and B, and transmitting the light beams of the other wavelengths.

Note that, the HOEs 32R and 32L are also reflective volume phase type HOEs, and have the same layer structure as in the HOEs 52R and 52L. In the HOEs 32R and 32L and the HOEs 52R and 52L, for example, pitches of interference fringe patterns may be approximately the same as each other.

The HOEs 52R and 52L are concentric to each other and are stacked in a state in which the interference fringe patterns are inverted by 180 (deg). In addition, the HOEs 52R and 52L are tightly fixed onto the second surface 10*b* of the light guide plate 10 by adhesion or the like so that the centers thereof match the central line X in a stacked state. The light beams of respective wavelengths which are modulated by the image display element 24 are sequentially incident on the HOEs 52R and 52L through the light guide plate 10.

The HOEs 52R and 52L diffract light beams of respective wavelengths which are sequentially incident by applying a predetermined angle so as to guide the light beams to the right eye and the left eye. The light beams of respective wavelengths which are diffracted by the HOEs 52R and 52L propagate through the inside of the light guide plate 10 while repeating total reflection at an interface between the light guide plate 10 and the air, and are incident on the HOEs 32R and 32L. Here, the HOEs 52R and 52L apply the same diffraction angle to light beams of respective wavelengths. Accordingly, light beams of all wavelengths of which incident positions on the light guide plate 10 are approximately the same (or which are emitted from approximately the same coordinates within an effective region of the image display element 24 according to another expression) propagate along approximately the same optical path inside the light guide plate 10 and are incident on approximately the same position on the HOEs 32R and 32L. According to another viewpoint, the HOEs 52R and 52L diffract light beams of respective wavelengths of RGB so that a pixel positional relationship of an image displayed on the effective region of the image display element 24 within the effective region is reliably reproduced on the HOEs 32R and 32L.

As described above, according to the aspect of the present invention, each of the HOEs 52R and 52L diffracts light beams of all wavelengths emitted from approximately the same coordinates in the effective region of the image display element 24 to be incident on the approximately the same position on each of the HOEs 32R and 32L. Alternatively, the HOEs 52R and 52L may be configured to diffract light beams of all wavelengths, which constitute originally the same pixels relatively shifted within the effective region of the image display element 24, to be incident on approximately the same position on the HOEs 32R and 32L.

The light beams of respective wavelengths which are incident onto the HOEs 32R and 32L are diffracted by the HOEs 32R and 32L and are sequentially emitted to the outside from the second surface 10*b* of the light guide plate 10 in an approximately vertical manner. The light beams of respective wavelengths which are emitted as approximately parallel light beams as described above are imaged on a right eye retina and a left eye retina of a user as a virtual image I of an image generated by the image display element 24. In addition, a condenser operation may be applied to the HOEs 32R and 32L so that the user can observe the virtual image I of an enlarged image. That is, as light beams are incident on a peripheral region of the HOEs 32R and 32L, the light beams may be emitted at an angle to be close to the center of the pupil and may be imaged on a user's retina. Alternatively, in order to allow a user to observe the virtual image I of the enlarged image, the HOEs 52R and 52L may diffract light beams of respective wavelengths of RGB so that a pixel positional relationship on the HOEs 32R and 32L has a similar shape that is enlarged with respect to the pixel positional relationship of the image displayed on the effective region of the image display element 24 within the effective region.

Since the higher a refractive index is, the shorter an equivalent optical path length in air of light beams propagating through the inside of the light guide plate 10 is, when using the optical glass having a high refractive index according to this embodiment, an apparent viewing angle with respect to a width of the image display element 24 can be enlarged. In addition, since the specific gravity is suppressed to be low although the refractive index is high, a light guide plate that is light in weight and is capable of obtaining the above-described effect can be provided.

Note that, the light guide plate that is an aspect of the present invention can be used in a see-through transmissive head-mounted display, a non-transmissive head-mounted display, or the like.

In the head-mounted display, since the light guide plate includes the optical glass having a high refractive index and a low specific gravity according to this embodiment, a sense of immersion due to a wide viewing angle is excellent. Accordingly, the head-mounted display is suitable as an image display device that is used in combination with an information terminal, or that is used to provide augmented reality (AR) or the like, or to provide movie watching, gaming, virtual reality (VR), or the like.

Hereinbefore, description has been with reference to the head-mounted display, but the light guide plate may be attached to other image display devices.

EXAMPLES

Hereinafter, the present invention will be described in more detail with reference to examples. However, the present invention is not limited to aspects illustrated in the examples.

Example 1

Glass samples having glass compositions shown in Table 1 were prepared in the following procedure, and various evaluations were performed. Evaluation results are shown in Table 1.

[Preparation of Optical Glass]

Compound raw materials corresponding to constituent components of glass, that is, raw materials such as phosphates, carbonates, and oxides were weighed, and were sufficiently mixed to obtain a combination raw material. The combination raw material was put into a platinum crucible and was heated and melted at 1000° C. to 1350° C. in the atmospheric atmosphere. The resultant melt was stirred to be homogenized and clarified, thereby obtaining molten glass. The molten glass was cast into a mold to be molded and was slowly cooled, thereby obtaining a glass sample having a block shape.

[Confirmation of Glass Component Composition]

With respect to the obtained glass sample, the amounts of respective glass components were measured by inductively coupled plasma atomic emission spectroscopic analysis (ICP-AES), and it was confirmed that the amounts satisfy respective compositions shown in Table 1. Note that, it was confirmed that fluorine (F) is not contained in all glass samples.

[Measurement of Optical Properties]

With respect to the obtained glass samples, a specific gravity, a refractive index nd, an Abbe number νd, a glass transition temperature Tg, and the degrees of coloration λ70 and λ5 were measured by the following methods.

[1] Specific Gravity

The specific gravity was measured by an Archimedes method.

[2] Refractive Index nd and Abbe Number νd

Refractive indexes nd, ng, nF, and nC were measured by a refractive index measuring method conforming to JIS B 7071-1, and the Abbe number νd was calculated on the basis of the following Expression.

$$\nu d=(nd-1)/(nF-nC)$$

[3] Glass Transition Temperature Tg

The glass transition temperature Tg was measured by using a differential scanning calorimeter (DSC3300SA) manufactured by NETZSCH Japan K.K. A sample was pulverized, the pulverized sample was weighed in a weight corresponding to approximately 0.02 cc was measured, and the weighed sample was put into a Pt pan with a diameter of 5 mm. The measurement was performed under conditions of a temperature increase rate of 10° C./min and a highest temperature of 1000° C. Alumina ($Al_2O_3$) was used as a standard sample.

[4] λ70, λ5

The sample was processed to have a thickness of 10 mm and to have parallel and optically polished planar surfaces, and a spectral transmittance in a wavelength region of 280 nm to 700 nm was measured. An intensity of light beams vertically incident on one of the optically polished planar surfaces was set as an intensity A, and an intensity of light beams emitted from the other planar surface was set as an intensity B, thereby calculating a spectral transmittance B/A. A wavelength at which the spectral transmittance becomes 70% was set as λ70, and a wavelength at which the spectral transmittance becomes 5% was set as λ5. Note that, a reflection loss of light beams on a sample surface is also included in the spectral transmittance.

Results are shown in the following tables.

TABLE 1-1

| Sample | 1 | 2 | 3 | 4 | 5 | 6 | 7 | 8 | 9 | 10 |
|---|---|---|---|---|---|---|---|---|---|---|
| $P_2O_5$ | 24.79 | 22.51 | 23.35 | 23.91 | 23.93 | 24.43 | 20.28 | 24.65 | 20.98 | 24.10 |
| $SiO_2$ | 0.00 | 0.00 | 0.00 | 0.00 | 0.00 | 0.00 | 0.00 | 0.00 | 0.00 | 0.00 |
| $B_2O_3$ | 0.00 | 0.00 | 0.74 | 2.28 | 1.90 | 0.00 | 2.55 | 0.00 | 2.64 | 0.00 |
| $Al_2O_3$ | 0.00 | 0.00 | 0.00 | 0.00 | 0.00 | 0.00 | 0.00 | 0.00 | 0.00 | 0.00 |
| $Li_2O$ | 0.00 | 0.08 | 0.08 | 0.08 | 0.08 | 2.40 | 0.00 | 2.08 | 0.00 | 2.03 |
| $Na_2O$ | 0.00 | 0.00 | 0.00 | 0.00 | 0.00 | 0.00 | 0.00 | 0.00 | 0.00 | 0.00 |
| $K_2O$ | 4.20 | 3.82 | 3.96 | 3.03 | 3.55 | 1.62 | 1.74 | 2.73 | 1.96 | 2.67 |
| MgO | 0.00 | 0.00 | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 | 0.00 | 0.00 |

TABLE 1-1-continued

| | | | | | | | | | | |
|---|---|---|---|---|---|---|---|---|---|---|
| SrO | 0.00 | 0.00 | 0.00 | 0.00 | 0.00 | 0.00 | 0.00 | 0.00 | 0.00 | 0.00 |
| BaO | 3.26 | 3.15 | 3.26 | 3.34 | 1.67 | 3.52 | 10.95 | 0.00 | 11.32 | 3.47 |
| ZnO | 0.00 | 0.00 | 0.00 | 0.00 | 0.00 | 0.00 | 0.00 | 1.88 | 0.00 | 0.00 |
| $TiO_2$ | 25.54 | 21.42 | 23.06 | 23.62 | 23.64 | 14.66 | 10.34 | 14.80 | 15.40 | 13.56 |
| $Nb_2O_5$ | 31.15 | 38.31 | 36.90 | 34.89 | 36.38 | 53.37 | 54.14 | 53.86 | 47.71 | 54.17 |
| $ZrO_2$ | 0.00 | 0.00 | 0.00 | 0.00 | 0.00 | 0.00 | 0.00 | 0.00 | 0.00 | 0.00 |
| $Bi_2O_3$ | 0.00 | 0.00 | 0.00 | 0.00 | 0.00 | 0.00 | 0.00 | 0.00 | 0.00 | 0.00 |
| $WO_3$ | 11.07 | 10.71 | 8.64 | 8.85 | 8.86 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 | 0.00 | 0.00 |
| $Sb_2O_3$ | 0.00 | 0.20 | 0.00 | 0.00 | 0.00 | 0.00 | 0.00 | 0.00 | 0.00 | 0.00 |
| Total | 100.00 | 100.20 | 100.00 | 100.00 | 100.00 | 100.00 | 100.00 | 100.00 | 100.00 | 100.00 |
| $Al_2O_3$ + $SiO_2$ | 0.00 | 0.00 | 0.00 | 0.00 | 0.00 | 0.00 | 0.00 | 0.00 | 0.00 | 0.00 |
| $Li_2O$ + $Na_2O$ + $K_2O$ | 4.20 | 3.90 | 4.04 | 3.11 | 3.63 | 4.02 | 1.74 | 4.80 | 1.96 | 4.70 |
| ZnO + SrO + BaO | 3.26 | 3.15 | 3.26 | 3.34 | 1.67 | 3.52 | 10.95 | 1.88 | 11.32 | 3.47 |
| nd | 1.99414 | 2.01533 | 2.00405 | 1.99236 | 1.99614 | 2.00625 | 2.00525 | 1.99942 | 2.00177 | 2.00074 |
| νd | 16.56 | 16.42 | 16.62 | 16.85 | 16.67 | 17.35 | 17.81 | 17.04 | 17.5 | 17.4 |
| Specific gravity | 3.649 | 3.74 | 3.671 | 3.624 | 3.602 | 3.666 | 3.855 | 3.616 | 3.801 | 3.661 |
| Tg(° C.) | 667 | 653 | 657 | 631 | 634 | 637 | 675 | 628 | 649 | 647 |
| λ70(nm) | 594 | 526 | 519 | 510 | 512 | 515 | 519 | 509 | 511 | 518 |
| λ5(nm) | 408 | 412 | 405 | 404 | 404 | 396 | 394 | 396 | 397 | 395 |
| nd/specific gravity | 0.55 | 0.54 | 0.55 | 0.55 | 0.55 | 0.55 | 0.52 | 0.55 | 0.53 | 0.55 |

| Sample | 11 | 12 | 13 | 14 | 15 | 16 | 17 | 18 | 19 | 20 |
|---|---|---|---|---|---|---|---|---|---|---|
| $P_2O_5$ | 23.20 | 23.37 | 24.08 | 24.26 | 24.14 | 24.58 | 23.87 | 23.78 | 24.12 | 24.77 |
| $SiO_2$ | 0.00 | 0.00 | 0.00 | 0.00 | 0.00 | 0.00 | 0.00 | 0.00 | 0.00 | 0.00 |
| $B_2O_3$ | 2.00 | 2.01 | 2.07 | 2.09 | 2.08 | 2.45 | 2.05 | 2.05 | 2.41 | 2.47 |
| $Al_2O_3$ | 0.00 | 0.00 | 0.00 | 0.00 | 0.00 | 0.00 | 0.00 | 0.00 | 0.00 | 0.00 |
| $Li_2O$ | 1.97 | 2.33 | 2.05 | 2.42 | 2.59 | 2.02 | 2.20 | 2.02 | 1.12 | 1.33 |
| $Na_2O$ | 0.00 | 0.00 | 0.00 | 0.00 | 0.00 | 0.00 | 0.00 | 0.00 | 0.71 | 0.00 |
| $K_2O$ | 1.62 | 0.54 | 1.68 | 0.56 | 0.00 | 0.00 | 0.56 | 1.11 | 1.09 | 1.67 |
| MgO | 0.00 | 0.00 | 0.00 | 0.00 | 0.00 | 0.00 | 0.00 | 0.00 | 0.00 | 0.95 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 3.52 | 3.54 | 3.65 | 3.68 | 5.49 | 5.40 | 5.43 | 5.41 | 5.30 | 1.81 |
| ZnO | 0.00 | 0.00 | 0.00 | 0.00 | 0.00 | 0.00 | 0.00 | 0.00 | 0.00 | 0.00 |
| $TiO_2$ | 12.82 | 12.92 | 19.01 | 19.16 | 18.11 | 18.75 | 18.85 | 18.78 | 19.32 | 19.84 |
| $Nb_2O_5$ | 54.87 | 55.28 | 47.46 | 47.83 | 47.59 | 46.80 | 47.05 | 46.87 | 45.93 | 47.16 |
| $ZrO_2$ | 0.00 | 0.00 | 0.00 | 0.00 | 0.00 | 0.00 | 0.00 | 0.00 | 0.00 | 0.00 |
| $Bi_2O_3$ | 0.00 | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 | 0.00 | 0.00 |
| $Sb_2O_3$ | 0.00 | 0.00 | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 | 100.00 | 100.00 |
| $Al_2O_3$ + $SiO_2$ | 0.00 | 0.00 | 0.00 | 0.00 | 0.00 | 0.00 | 0.00 | 0.00 | 0.00 | 0.00 |
| $Li_2O$ + $Na_2O$ + $K_2O$ | 3.59 | 2.87 | 3.73 | 2.98 | 2.59 | 2.02 | 2.76 | 3.13 | 2.92 | 3.00 |
| ZnO + SrO + BaO | 3.52 | 3.54 | 3.65 | 3.68 | 5.49 | 5.40 | 5.43 | 5.41 | 5.30 | 1.81 |
| nd | 2.00086 | 2.00595 | 2.00043 | 2.00583 | 2.00259 | 2.00058 | 2.00535 | 2.00261 | 1.99851 | 1.99591 |
| νd | 17.56 | 17.54 | 17.39 | 17.38 | 17.6 | 17.5 | 17.45 | 17.47 | 17.37 | 17.34 |
| Specific gravity | 3.653 | 3.663 | 3.595 | 3.604 | 3.639 | 3.623 | 3.634 | 3.634 | 3.608 | 3.537 |
| Tg(° C.) | 618 | 606 | 600 | 592 | 612 | 600 | 603 | 616 | 616 | 610 |
| λ70(nm) | 512 | 512 | 506 | 513 | 507 | 504 | 513 | 511 | 506 | 509 |
| λ5(nm) | 394 | 395 | 397 | 397 | 397 | 396 | 397 | 397 | 396 | 396 |
| nd/specific gravity | 0.55 | 0.55 | 0.56 | 0.56 | 0.55 | 0.55 | 0.55 | 0.55 | 0.55 | 0.56 |

TABLE 1-2

| Sample | 1 | 2 | 3 | 4 | 5 | 6 | 7 | 8 | 9 | 10 |
|---|---|---|---|---|---|---|---|---|---|---|
| $P_2O_5$ + $TiO_2$ + $Nb_2O_5$ | 81.47 | 82.24 | 83.31 | 82.42 | 83.94 | 92.46 | 84.76 | 93.31 | 84.09 | 91.83 |
| SrO + BaO | 3.26 | 3.15 | 3.26 | 3.34 | 1.67 | 3.52 | 10.95 | 0.00 | 11.32 | 3.47 |
| MgO + CaO + ZnO + SrO + BaO | 3.26 | 3.15 | 3.26 | 3.34 | 1.67 | 3.52 | 10.95 | 1.88 | 11.32 | 3.47 |
| $Li_2O$ + $Na_2O$ + $K_2O$ + MgO + CaO + ZnO + SrO + BaO | 7.45 | 7.04 | 7.31 | 6.45 | 5.30 | 7.54 | 12.69 | 6.69 | 13.28 | 8.17 |
| $TiO_2$ + $Nb_2O_5$ | 56.69 | 59.73 | 59.96 | 58.51 | 60.01 | 68.03 | 64.48 | 68.66 | 63.11 | 67.73 |
| $TiO_2$ + $Nb_2O_5$ + $WO_3$ + $Bi_2O_3$ | 67.76 | 70.44 | 68.60 | 67.36 | 68.87 | 68.03 | 64.48 | 68.66 | 63.11 | 67.73 |

TABLE 1-2-continued

| | | | | | | | | | | |
|---|---|---|---|---|---|---|---|---|---|---|
| $P_2O_5/(P_2O_5 + TiO_2 + Nb_2O_5)$ | 0.30 | 0.27 | 0.28 | 0.29 | 0.29 | 0.26 | 0.24 | 0.26 | 0.25 | 0.26 |
| $K_2O/(Li_2O + Na_2O + K_2O)$ | 1.00 | 0.98 | 0.98 | 0.97 | 0.98 | 0.40 | 1.00 | 0.57 | 1.00 | 0.57 |
| $TiO_2/(Li_2O + Na_2O + K_2O)$ | 6.08 | 5.50 | 5.71 | 7.59 | 6.52 | 3.65 | 5.94 | 3.08 | 7.87 | 2.89 |
| $(MgO + CaO + ZnO + SrO + BaO)/(Li_2O + Na_2O + K_2O)$ | 0.78 | 0.81 | 0.81 | 1.07 | 0.46 | 0.87 | 6.29 | 0.39 | 5.79 | 0.74 |
| $BaO/(MgO + CaO + ZnO + SrO + BaO)$ | 1.00 | 1.00 | 1.00 | 1.00 | 1.00 | 1.00 | 1.00 | 0.00 | 1.00 | 1.00 |
| $TiO_2/(MgO + CaO + ZnO + SrO + BaO)$ | 7.84 | 6.80 | 7.06 | 7.06 | 14.13 | 4.17 | 0.94 | 7.85 | 1.36 | 3.91 |
| $TiO_2/(TiO_2 + Nb_2O_5)$ | 0.45 | 0.36 | 0.38 | 0.40 | 0.39 | 0.22 | 0.16 | 0.22 | 0.24 | 0.20 |
| $TiO_2/(TiO_2 + Nb_2O_5 + WO_3 + Bi_2O_3)$ | 0.38 | 0.30 | 0.34 | 0.35 | 0.34 | 0.22 | 0.16 | 0.22 | 0.24 | 0.20 |
| $TiO_2/Nb_2O_5$ | 0.82 | 0.56 | 0.62 | 0.68 | 0.65 | 0.27 | 0.19 | 0.27 | 0.32 | 0.25 |
| $TiO_2/(Nb_2O_5 + WO_3 + Bi_2O_3)$ | 0.60 | 0.44 | 0.51 | 0.54 | 0.52 | 0.27 | 0.19 | 0.27 | 0.32 | 0.25 |
| $(Li_2O + Na_2O + MgO + CaO + ZnO + SrO)/(K_2O + BaO)$ | 0.00 | 0.01 | 0.01 | 0.01 | 0.02 | 0.47 | 0.00 | 1.45 | 0.00 | 0.33 |
| $(TiO_2 + Nb_2O_5)/(SiO_2 + B_2O_3 + Li_2O + Na_2O + K_2O + MgO + CaO + ZnO + SrO + BaO)$ | 7.60 | 8.48 | 7.45 | 6.70 | 8.33 | 9.02 | 4.23 | 10.27 | 3.97 | 8.29 |
| Sample | 11 | 12 | 13 | 14 | 15 | 16 | 17 | 18 | 19 | 20 |
| $P_2O_5 + TiO_2 + Nb_2O_5$ | 90.90 | 91.57 | 90.55 | 91.25 | 89.85 | 90.13 | 89.76 | 89.42 | 89.38 | 91.77 |
| SrO + BaO | 3.52 | 3.54 | 3.65 | 3.68 | 5.49 | 5.40 | 5.43 | 5.41 | 5.30 | 1.81 |
| MgO + CaO + ZnO + SrO + BaO | 3.52 | 3.54 | 3.65 | 3.68 | 5.49 | 5.40 | 5.43 | 5.41 | 5.30 | 2.77 |
| $Li_2O + Na_2O + K_2O + MgO + CaO + ZnO + SrO + BaO$ | 7.11 | 6.42 | 7.38 | 6.66 | 8.08 | 7.42 | 8.19 | 8.53 | 8.22 | 5.76 |
| $TiO_2 + Nb_2O_5$ | 67.70 | 68.20 | 66.47 | 66.99 | 65.70 | 65.55 | 65.89 | 65.64 | 65.26 | 67.00 |
| $TiO_2 + Nb_2O_5 + WO_3 + Bi_2O_3$ | 67.70 | 68.20 | 66.47 | 66.99 | 65.70 | 65.55 | 65.89 | 65.64 | 65.26 | 67.00 |
| $P_2O_5/(P_2O_5 + TiO_2 + Nb_2O_5)$ | 0.26 | 0.26 | 0.27 | 0.27 | 0.27 | 0.27 | 0.27 | 0.27 | 0.27 | 0.27 |
| $K_2O/(Li_2O + Na_2O + K_2O)$ | 0.45 | 0.19 | 0.45 | 0.19 | 0.00 | 0.00 | 0.20 | 0.35 | 0.37 | 0.56 |
| $TiO_2/(Li_2O + Na_2O + K_2O)$ | 3.57 | 4.49 | 5.10 | 6.42 | 7.00 | 9.30 | 6.83 | 6.00 | 6.62 | 6.62 |
| $(MgO + CaO + ZnO + SrO + BaO)/(Li_2O + Na_2O + K_2O)$ | 0.98 | 1.23 | 0.98 | 1.23 | 2.12 | 2.68 | 1.97 | 1.73 | 1.82 | 0.92 |
| $BaO/(MgO + CaO + ZnO + SrO + BaO)$ | 1.00 | 1.00 | 1.00 | 1.00 | 1.00 | 1.00 | 1.00 | 1.00 | 1.00 | 0.66 |
| $TiO_2/(MgO + CaO + ZnO + SrO + BaO)$ | 3.65 | 3.65 | 5.21 | 5.21 | 3.30 | 3.47 | 3.47 | 3.47 | 3.65 | 7.17 |
| $TiO_2/(TiO_2 + Nb_2O_5)$ | 0.19 | 0.19 | 0.29 | 0.29 | 0.28 | 0.29 | 0.29 | 0.29 | 0.30 | 0.30 |
| $TiO_2/(TiO_2 + Nb_2O_5 + WO_3 + Bi_2O_3)$ | 0.19 | 0.19 | 0.29 | 0.29 | 0.28 | 0.29 | 0.29 | 0.29 | 0.30 | 0.30 |
| $TiO_2/Nb_2O_5$ | 0.23 | 0.23 | 0.40 | 0.40 | 0.38 | 0.40 | 0.40 | 0.40 | 0.42 | 0.42 |
| $TiO_2/(Nb_2O_5 + WO_3 + Bi_2O_3)$ | 0.23 | 0.23 | 0.40 | 0.40 | 0.38 | 0.40 | 0.40 | 0.40 | 0.42 | 0.42 |
| $(Li_2O + Na_2O + MgO + CaO + ZnO + SrO)/(K_2O + BaO)$ | 0.38 | 0.57 | 0.38 | 0.57 | 0.47 | 0.37 | 0.37 | 0.31 | 0.29 | 0.65 |
| $(TiO_2 + Nb_2O_5)/(SiO_2 + B_2O_3 + Li_2O + Na_2O + K_2O + MgO + CaO + ZnO + SrO + BaO)$ | 7.44 | 8.09 | 7.03 | 7.66 | 6.47 | 6.64 | 6.43 | 6.20 | 6.14 | 8.14 |

TABLE 2-1

| Sample | 21 | 22 | 23 | 24 | 25 | 26 | 27 | 28 | 29 | 30 |
|---|---|---|---|---|---|---|---|---|---|---|
| $P_2O_5$ | 24.67 | 24.40 | 24.12 | 24.12 | 23.89 | 24.39 | 24.67 | 24.39 | 24.67 | 25.11 |
| $SiO_2$ | 0.00 | 0.00 | 0.00 | 0.00 | 0.00 | 0.00 | 0.00 | 0.00 | 0.00 | 0.00 |
| $B_2O_3$ | 2.46 | 2.43 | 2.41 | 2.41 | 2.38 | 2.43 | 2.46 | 2.43 | 2.46 | 2.02 |
| $Al_2O_3$ | 0.00 | 0.00 | 0.00 | 0.00 | 0.00 | 0.00 | 0.00 | 0.00 | 0.00 | 0.00 |
| $Li_2O$ | 1.32 | 1.31 | 0.95 | 0.77 | 0.94 | 1.13 | 1.14 | 0.96 | 0.97 | 1.13 |
| $Na_2O$ | 0.00 | 0.00 | 1.43 | 2.14 | 0.00 | 0.72 | 0.73 | 1.44 | 1.46 | 0.72 |
| $K_2O$ | 1.67 | 1.65 | 0.54 | 0.00 | 1.61 | 1.10 | 1.11 | 0.55 | 0.56 | 1.09 |

TABLE 2-1-continued

| | | | | | | | | | | |
|---|---|---|---|---|---|---|---|---|---|---|
| MgO | 0.00 | 0.00 | 0.00 | 0.00 | 0.00 | 0.00 | 0.00 | 0.00 | 0.00 | 0.00 |
| CaO | 1.32 | 0.00 | 0.00 | 0.00 | 1.28 | 0.65 | 1.32 | 0.65 | 1.32 | 0.65 |
| SrO | 0.00 | 2.42 | 0.00 | 0.00 | 0.00 | 0.00 | 0.00 | 0.00 | 0.00 | 0.00 |
| BaO | 1.81 | 1.79 | 5.30 | 5.30 | 5.25 | 3.57 | 1.81 | 3.57 | 1.81 | 3.56 |
| ZnO | 0.00 | 0.00 | 0.00 | 0.00 | 0.00 | 0.00 | 0.00 | 0.00 | 0.00 | 0.00 |
| $TiO_2$ | 19.76 | 19.55 | 19.32 | 19.32 | 19.14 | 19.54 | 19.76 | 19.54 | 19.77 | 19.46 |
| $Nb_2O_5$ | 46.99 | 46.47 | 45.93 | 45.93 | 45.50 | 46.45 | 46.99 | 46.45 | 46.99 | 46.26 |
| $ZrO_2$ | 0.00 | 0.00 | 0.00 | 0.00 | 0.00 | 0.00 | 0.00 | 0.00 | 0.00 | 0.00 |
| $Bi_2O_3$ | 0.00 | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 | 0.00 | 0.00 |
| $Sb_2O_3$ | 0.00 | 0.00 | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 | 100.00 | 100.00 |
| $Al_2O_3 + SiO_2$ | 0.00 | 0.00 | 0.00 | 0.00 | 0.00 | 0.00 | 0.00 | 0.00 | 0.00 | 0.00 |
| $Li_2O + Na_2O + K_2O$ | 2.99 | 2.95 | 2.92 | 2.92 | 2.55 | 2.95 | 2.98 | 2.95 | 2.98 | 2.94 |
| ZnO + SrO + BaO | 1.81 | 4.20 | 5.30 | 5.30 | 5.25 | 3.57 | 1.81 | 3.57 | 1.81 | 3.56 |
| nd | 1.99759 | 1.99748 | 1.99838 | 1.99845 | 1.99638 | 1.99815 | 1.99802 | 1.99831 | 1.99851 | 1.99576 |
| νd | 17.37 | 17.36 | 17.37 | 17.35 | 17.55 | 17.36 | 17.33 | 17.32 | 17.33 | 17.35 |
| Specific gravity | 3.551 | 3.584 | 3.614 | 3.618 | 3.624 | 3.581 | 3.551 | 3.592 | 3.562 | 3.573 |
| Tg(° C.) | 614 | 615 | 622 | 621 | 626 | 618 | 614 | 615 | 606 | 617 |
| λ70(nm) | 506 | 512 | 505 | 507 | 503 | 507 | 506 | 503 | 505 | 507 |
| λ5(nm) | 396 | 397 | 396 | 397 | 396 | 396 | 396 | 396 | 396 | 396 |
| nd/specific gravity | 0.56 | 0.56 | 0.55 | 0.55 | 0.55 | 0.56 | 0.56 | 0.56 | 0.56 | 0.56 |

| Sample | 31 | 32 | 33 | 34 | 35 | 36 | 37 | 38 | 39 | 40 |
|---|---|---|---|---|---|---|---|---|---|---|
| $P_2O_5$ | 25.78 | 25.77 | 26.15 | 26.82 | 26.47 | 27.18 | 25.97 | 25.97 | 27.49 | 27.80 |
| $SiO_2$ | 0.00 | 0.00 | 0.00 | 0.00 | 0.00 | 0.00 | 0.00 | 0.00 | 0.00 | 0.00 |
| $B_2O_3$ | 1.20 | 1.20 | 1.63 | 1.67 | 0.80 | 0.40 | 1.18 | 0.00 | 0.00 | 0.00 |
| $Al_2O_3$ | 0.59 | 0.00 | 0.00 | 0.00 | 0.00 | 0.00 | 0.00 | 0.00 | 0.00 | 0.00 |
| $Li_2O$ | 1.12 | 1.12 | 1.14 | 1.16 | 1.11 | 1.11 | 0.67 | 0.67 | 0.67 | 0.68 |
| $Na_2O$ | 0.71 | 0.71 | 0.72 | 0.74 | 0.71 | 0.71 | 0.00 | 0.35 | 0.70 | 0.70 |
| $K_2O$ | 1.09 | 1.09 | 1.10 | 1.13 | 1.08 | 1.08 | 1.06 | 3.18 | 2.12 | 2.14 |
| MgO | 0.00 | 0.00 | 0.00 | 0.00 | 0.00 | 0.00 | 0.00 | 0.00 | 0.00 | 0.00 |
| CaO | 0.65 | 1.29 | 0.66 | 0.67 | 1.29 | 1.28 | 2.53 | 1.26 | 0.63 | 1.27 |
| SrO | 0.00 | 0.00 | 0.00 | 0.00 | 0.00 | 0.00 | 0.00 | 0.00 | 0.00 | 0.00 |
| BaO | 3.54 | 3.53 | 3.59 | 3.68 | 3.52 | 3.51 | 3.45 | 3.45 | 3.44 | 1.74 |
| ZnO | 0.00 | 0.00 | 0.00 | 0.00 | 0.00 | 0.00 | 0.00 | 0.00 | 0.00 | 0.00 |
| $TiO_2$ | 19.34 | 19.33 | 21.49 | 25.87 | 19.25 | 19.17 | 20.24 | 20.23 | 20.18 | 20.40 |
| $Nb_2O_5$ | 45.98 | 45.95 | 43.53 | 38.26 | 45.76 | 45.57 | 44.90 | 44.89 | 44.77 | 45.27 |
| $ZrO_2$ | 0.00 | 0.00 | 0.00 | 0.00 | 0.00 | 0.00 | 0.00 | 0.00 | 0.00 | 0.00 |
| $Bi_2O_3$ | 0.00 | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 | 0.00 | 0.00 |
| $Sb_2O_3$ | 0.00 | 0.00 | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 | 100.00 | 100.00 |
| $Al_2O_3 + SiO_2$ | 0.59 | 0.00 | 0.00 | 0.00 | 0.00 | 0.00 | 0.00 | 0.00 | 0.00 | 0.00 |
| $Li_2O + Na_2O + K_2O$ | 2.92 | 2.92 | 2.96 | 3.04 | 2.91 | 2.90 | 1.73 | 4.20 | 3.48 | 3.52 |
| ZnO + SrO + BaO | 3.54 | 3.53 | 3.59 | 3.68 | 3.52 | 3.51 | 3.45 | 3.45 | 3.44 | 1.74 |
| nd | 1.98895 | 1.99392 | 1.99251 | 1.99207 | 1.99043 | 1.98683 | 1.99601 | 1.98934 | 1.98684 | 1.98582 |
| νd | 17.45 | 17.42 | 17.32 | 17.2 | 17.43 | 17.46 | 17.46 | 17.3 | 17.23 | 17.2 |
| Specific gravity | 3.563 | 3.581 | 3.545 | 3.509 | 3.571 | 3.563 | 3.587 | 3.569 | 3.544 | 3.516 |
| Tg(° C.) | 625 | 627 | 623 | 615 | 628 | 639 | 644 | 654 | 663 | 657 |
| λ70(nm) | 503 | 503 | 507 | 503 | 511 | 502 | 491 | 500 | 501 | 501 |
| λ5(nm) | 396 | 396 | 397 | 398 | 396 | 396 | 396 | 398 | 397 | 397 |
| nd/specific gravity | 0.56 | 0.56 | 0.56 | 0.57 | 0.56 | 0.56 | 0.56 | 0.56 | 0.56 | 0.56 |

TABLE 2-2

| Sample | 21 | 22 | 23 | 24 | 25 | 26 | 27 | 28 | 29 | 30 | 31 |
|---|---|---|---|---|---|---|---|---|---|---|---|
| $P_2O_5 + TiO_2 + Nb_2O_5$ | 91.42 | 90.41 | 89.38 | 89.38 | 88.54 | 90.39 | 91.43 | 90.39 | 91.43 | 90.83 | 91.10 |
| SrO + BaO | 1.81 | 4.20 | 5.30 | 5.30 | 5.25 | 3.57 | 1.81 | 3.57 | 1.81 | 3.56 | 3.54 |
| MgO + CaO + ZnO + SrO + BaO | 3.13 | 4.20 | 5.30 | 5.30 | 6.53 | 4.23 | 3.13 | 4.23 | 3.13 | 4.21 | 4.18 |
| $Li_2O + Na_2O + K_2O$ + MgO + CaO + ZnO + SrO + BaO | 6.11 | 7.15 | 8.22 | 8.22 | 9.08 | 7.18 | 6.11 | 7.18 | 6.11 | 7.15 | 7.10 |
| $TiO_2 + Nb_2O_5$ | 66.75 | 66.01 | 65.26 | 65.26 | 64.64 | 66.00 | 66.75 | 66.00 | 66.75 | 65.72 | 65.32 |
| $TiO_2 + Nb_2O_5 + WO_3 + Bi_2O_3$ | 66.75 | 66.01 | 65.26 | 65.26 | 64.64 | 66.00 | 66.75 | 66.00 | 66.75 | 65.72 | 65.32 |
| $P_2O_5/(P_2O_5 + TiO_2 + Nb_2O_5)$ | 0.27 | 0.27 | 0.27 | 0.27 | 0.27 | 0.27 | 0.27 | 0.27 | 0.27 | 0.28 | 0.28 |

TABLE 2-2-continued

| | | | | | | | | | | | |
|---|---|---|---|---|---|---|---|---|---|---|---|
| $K_2O/(Li_2O + Na_2O + K_2O)$ | 0.56 | 0.56 | 0.19 | 0.00 | 0.63 | 0.37 | 0.37 | 0.19 | 0.19 | 0.37 | 0.37 |
| $TiO_2/(Li_2O + Na_2O + K_2O)$ | 6.62 | 6.62 | 6.62 | 6.62 | 7.51 | 6.62 | 6.62 | 6.62 | 6.62 | 6.62 | 6.62 |
| $(MgO + CaO + ZnO + SrO + BaO)/(Li_2O + Na_2O + K_2O)$ | 1.05 | 1.42 | 1.82 | 1.82 | 2.56 | 1.43 | 1.05 | 1.43 | 1.05 | 1.43 | 1.43 |
| $BaO/(MgO + CaO + ZnO + SrO + BaO)$ | 0.58 | 0.43 | 1.00 | 1.00 | 0.80 | 0.85 | 0.58 | 0.85 | 0.58 | 0.85 | 0.85 |
| $TiO_2/(MgO + CaO + ZnO + SrO + BaO)$ | 6.32 | 4.65 | 3.65 | 3.65 | 2.93 | 4.62 | 6.32 | 4.62 | 6.32 | 4.62 | 4.62 |
| $TiO_2/(TiO_2 + Nb_2O_5)$ | 0.30 | 0.30 | 0.30 | 0.30 | 0.30 | 0.30 | 0.30 | 0.30 | 0.30 | 0.30 | 0.30 |
| $TiO_2/(TiO_2 + Nb_2O_5 + WO_3 + Bi_2O_3)$ | 0.30 | 0.30 | 0.30 | 0.30 | 0.30 | 0.30 | 0.30 | 0.30 | 0.30 | 0.30 | 0.30 |
| $TiO_2/Nb_2O_5$ | 0.42 | 0.42 | 0.42 | 0.42 | 0.42 | 0.42 | 0.42 | 0.42 | 0.42 | 0.42 | 0.42 |
| $TiO_2/(Nb_2O_5 + WO_3 + Bi_2O_3)$ | 0.42 | 0.42 | 0.42 | 0.42 | 0.42 | 0.42 | 0.42 | 0.42 | 0.42 | 0.42 | 0.42 |
| $(Li_2O + Na_2O + MgO + CaO + ZnO + SrO)/(K_2O + BaO)$ | 0.76 | 1.08 | 0.41 | 0.55 | 0.32 | 0.54 | 1.10 | 0.74 | 1.59 | 0.54 | 0.54 |
| $(TiO_2 + Nb_2O_5)/(SiO_2 + B_2O_3 + Li_2O + Na_2O + K_2O + MgO + CaO + ZnO + SrO + BaO)$ | 7.78 | 6.88 | 6.14 | 6.14 | 5.64 | 6.87 | 7.78 | 6.87 | 7.79 | 7.17 | 7.86 |

| Sample | 32 | 33 | 34 | 35 | 36 | 37 | 38 | 39 | 40 |
|---|---|---|---|---|---|---|---|---|---|
| $P_2O_5 + TiO_2 + Nb_2O_5$ | 91.05 | 91.17 | 90.94 | 91.49 | 91.92 | 91.11 | 91.08 | 92.44 | 93.47 |
| $SrO + BaO$ | 3.53 | 3.59 | 3.68 | 3.52 | 3.51 | 3.45 | 3.45 | 3.44 | 1.74 |
| $MgO + CaO + ZnO + SrO + BaO$ | 4.83 | 4.24 | 4.35 | 4.81 | 4.79 | 5.98 | 4.71 | 4.07 | 3.01 |
| $Li_2O + Na_2O + K_2O + MgO + CaO + ZnO + SrO + BaO$ | 7.75 | 7.21 | 7.39 | 7.71 | 7.68 | 7.71 | 8.92 | 7.56 | 6.53 |
| $TiO_2 + Nb_2O_5$ | 65.28 | 65.02 | 64.13 | 65.01 | 64.74 | 65.14 | 65.12 | 64.95 | 65.67 |
| $TiO_2 + Nb_2O_5 + WO_3 + Bi_2O_3$ | 65.28 | 65.02 | 64.13 | 65.01 | 64.74 | 65.14 | 65.12 | 64.95 | 65.67 |
| $P_2O_5/(P_2O_5 + TiO_2 + Nb_2O_5)$ | 0.28 | 0.29 | 0.29 | 0.29 | 0.30 | 0.29 | 0.29 | 0.30 | 0.30 |
| $K_2O/(Li_2O + Na_2O + K_2O)$ | 0.37 | 0.37 | 0.37 | 0.37 | 0.37 | 0.61 | 0.76 | 0.61 | 0.61 |
| $TiO_2/(Li_2O + Na_2O + K_2O)$ | 6.62 | 7.25 | 8.51 | 6.62 | 6.62 | 11.67 | 4.81 | 5.79 | 5.79 |
| $(MgO + CaO + ZnO + SrO + BaO)/(Li_2O + Na_2O + K_2O)$ | 1.65 | 1.43 | 1.43 | 1.65 | 1.65 | 3.45 | 1.12 | 1.17 | 0.86 |
| $BaO/(MgO + CaO + ZnO + SrO + BaO)$ | 0.73 | 0.85 | 0.85 | 0.73 | 0.73 | 0.58 | 0.73 | 0.85 | 0.58 |
| $TiO_2/(MgO + CaO + ZnO + SrO + BaO)$ | 4.00 | 5.06 | 5.94 | 4.00 | 4.00 | 3.38 | 4.29 | 4.95 | 6.77 |
| $TiO_2/(TiO_2 + Nb_2O_5)$ | 0.30 | 0.33 | 0.40 | 0.30 | 0.30 | 0.31 | 0.31 | 0.31 | 0.31 |
| $TiO_2/(TiO_2 + Nb_2O_5 + WO_3 + Bi_2O_3)$ | 0.30 | 0.33 | 0.40 | 0.30 | 0.30 | 0.31 | 0.31 | 0.31 | 0.31 |
| $TiO_2/Nb_2O_5$ | 0.42 | 0.49 | 0.68 | 0.42 | 0.42 | 0.45 | 0.45 | 0.45 | 0.45 |
| $TiO_2/(Nb_2O_5 + WO_3 + Bi_2O_3)$ | 0.42 | 0.49 | 0.68 | 0.42 | 0.42 | 0.45 | 0.45 | 0.45 | 0.45 |
| $(Li_2O + Na_2O + MgO + CaO + ZnO + SrO)/(K_2O + BaO)$ | 0.68 | 0.54 | 0.54 | 0.68 | 0.68 | 0.71 | 0.34 | 0.36 | 0.68 |
| $(TiO_2 + Nb_2O_5)/(SiO_2 + B_2O_3 + Li_2O + Na_2O + K_2O + MgO + CaO + ZnO + SrO + BaO)$ | 7.29 | 7.36 | 7.08 | 7.64 | 8.01 | 7.33 | 7.30 | 8.60 | 10.05 |

TABLE 3-1

| Sample | 41 | 42 | 43 | 44 | 45 | 46 | 47 | 48 | 49 | 50 |
|---|---|---|---|---|---|---|---|---|---|---|
| $P_2O_5$ | 26.57 | 26.29 | 26.50 | 26.33 | 26.49 | 26.86 | 26.91 | 26.99 | 27.28 | 27.06 |
| $SiO_2$ | 0.00 | 0.00 | 0.00 | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 | 0.00 | 0.00 | 0.00 |
| $Al_2O_3$ | 0.00 | 0.00 | 0.00 | 0.00 | 0.00 | 0.00 | 0.00 | 0.00 | 0.00 | 0.00 |
| $Li_2O$ | 0.50 | 0.50 | 0.50 | 0.50 | 0.50 | 0.25 | 0.42 | 0.42 | 0.42 | 0.59 |
| $Na_2O$ | 0.35 | 0.34 | 0.35 | 0.69 | 0.69 | 0.69 | 0.35 | 0.69 | 0.70 | 0.69 |
| $K_2O$ | 2.63 | 2.60 | 2.62 | 2.61 | 2.62 | 3.15 | 3.15 | 3.16 | 3.20 | 2.11 |
| MgO | 0.00 | 0.00 | 0.00 | 0.00 | 0.00 | 0.00 | 0.00 | 0.00 | 0.00 | 0.00 |
| CaO | 1.88 | 1.24 | 1.25 | 1.24 | 1.25 | 1.25 | 1.25 | 0.63 | 1.27 | 1.26 |

TABLE 3-1-continued

| | | | | | | | | | | |
|---|---|---|---|---|---|---|---|---|---|---|
| SrO | 0.00 | 0.00 | 0.00 | 0.00 | 0.00 | 0.00 | 0.00 | 0.00 | 0.00 | 0.00 |
| BaO | 3.43 | 5.09 | 3.42 | 3.40 | 3.42 | 3.41 | 3.42 | 3.43 | 1.73 | 3.44 |
| ZnO | 0.00 | 0.00 | 0.00 | 0.00 | 0.00 | 0.00 | 0.00 | 0.00 | 0.00 | 0.00 |
| $TiO_2$ | 20.08 | 19.87 | 20.92 | 18.13 | 19.13 | 20.00 | 20.04 | 20.10 | 20.32 | 20.15 |
| $Nb_2O_5$ | 44.56 | 44.08 | 44.44 | 47.10 | 45.90 | 44.39 | 44.47 | 44.59 | 45.08 | 44.71 |
| $ZrO_2$ | 0.00 | 0.00 | 0.00 | 0.00 | 0.00 | 0.00 | 0.00 | 0.00 | 0.00 | 0.00 |
| $Bi_2O_3$ | 0.00 | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 | 0.00 | 0.00 |
| $Sb_2O_3$ | 0.00 | 0.00 | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 | 100.00 | 100.00 |
| $Al_2O_3$ + $SiO_2$ | 0.00 | 0.00 | 0.00 | 0.00 | 0.00 | 0.00 | 0.00 | 0.00 | 0.00 | 0.00 |
| $Li_2O$ + $Na_2O$ + $K_2O$ | 3.48 | 3.44 | 3.47 | 3.79 | 3.81 | 4.09 | 3.91 | 4.27 | 4.32 | 3.39 |
| ZnO + SrO + BaO | 3.43 | 5.09 | 3.42 | 3.40 | 3.42 | 3.41 | 3.42 | 3.43 | 1.73 | 3.44 |
| nd | 1.9875 | 1.98784 | 1.99278 | 1.98749 | 1.98749 | 1.98176 | 1.98323 | 1.98268 | 1.98238 | 1.98778 |
| νd | 17.35 | 17.38 | 17.15 | 17.33 | 17.29 | 17.3 | 17.3 | 17.24 | 17.2 | 17.29 |
| Specific gravity | 3.565 | 3.599 | 3.565 | 3.579 | 3.57 | 3.545 | 3.55 | 3.544 | 3.519 | 3.558 |
| Tg(° C.) | 658 | 665 | 660 | 661 | 661 | 671 | 669 | 672 | 657 | 657 |
| λ70(nm) | 492 | 495 | 498 | 498 | 495 | 488 | 490 | 491 | 492 | 492 |
| λ5(nm) | 397 | 397 | 398 | 397 | 397 | 397 | 397 | 397 | 397 | 397 |
| nd/specific gravity | 0.56 | 0.55 | 0.56 | 0.56 | 0.56 | 0.56 | 0.56 | 0.56 | 0.56 | 0.56 |

| Sample | 51 | 52 | 53 | 54 | 55 | 56 | 57 | 58 | 59 | 60 |
|---|---|---|---|---|---|---|---|---|---|---|
| $P_2O_5$ | 27.01 | 26.93 | 26.64 | 26.67 | 26.81 | 27.11 | 27.26 | 26.67 | 26.72 | 26.76 |
| $SiO_2$ | 0.00 | 0.00 | 0.00 | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 | 0.00 | 0.00 | 0.00 |
| $Al_2O_3$ | 0.00 | 0.00 | 0.00 | 0.00 | 0.00 | 0.00 | 0.00 | 0.00 | 0.00 | 0.00 |
| $Li_2O$ | 0.42 | 0.42 | 0.41 | 0.41 | 0.42 | 0.42 | 0.42 | 0.08 | 0.25 | 0.25 |
| $Na_2O$ | 1.04 | 0.69 | 0.68 | 0.68 | 0.69 | 0.70 | 0.70 | 0.69 | 0.34 | 0.69 |
| $K_2O$ | 2.11 | 2.10 | 2.08 | 2.60 | 2.62 | 2.65 | 2.66 | 3.12 | 3.13 | 2.61 |
| MgO | 0.00 | 0.00 | 0.00 | 0.00 | 0.00 | 0.00 | 0.00 | 0.00 | 0.00 | 0.00 |
| CaO | 1.26 | 1.88 | 1.24 | 0.62 | 0.93 | 1.57 | 1.90 | 1.24 | 1.24 | 1.24 |
| SrO | 0.00 | 0.00 | 0.00 | 0.00 | 0.00 | 0.00 | 0.00 | 0.00 | 0.00 | 0.00 |
| BaO | 3.43 | 3.42 | 5.08 | 5.08 | 4.26 | 2.58 | 1.73 | 3.39 | 3.40 | 3.40 |
| ZnO | 0.00 | 0.00 | 0.00 | 0.00 | 0.00 | 0.00 | 0.00 | 0.00 | 0.00 | 0.00 |
| $TiO_2$ | 20.11 | 20.06 | 19.84 | 19.86 | 19.97 | 20.19 | 20.30 | 20.74 | 20.78 | 20.82 |
| $Nb_2O_5$ | 44.63 | 44.50 | 44.02 | 44.07 | 44.30 | 44.79 | 45.03 | 44.07 | 44.15 | 44.22 |
| $ZrO_2$ | 0.00 | 0.00 | 0.00 | 0.00 | 0.00 | 0.00 | 0.00 | 0.00 | 0.00 | 0.00 |
| $Bi_2O_3$ | 0.00 | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 | 0.00 | 0.00 |
| $Sb_2O_3$ | 0.00 | 0.00 | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 | 100.00 | 100.00 |
| $Al_2O_3$ + $SiO_2$ | 0.00 | 0.00 | 0.00 | 0.00 | 0.00 | 0.00 | 0.00 | 0.00 | 0.00 | 0.00 |
| $Li_2O$ + $Na_2O$ + $K_2O$ | 3.57 | 3.21 | 3.18 | 3.70 | 3.72 | 3.76 | 3.78 | 3.89 | 3.72 | 3.55 |
| ZnO + SrO + BaO | 3.43 | 3.42 | 5.08 | 5.08 | 4.26 | 2.58 | 1.73 | 3.39 | 3.40 | 3.40 |
| nd | 1.98621 | 1.98673 | 1.98703 | 1.98504 | 1.98487 | 1.98458 | 1.98423 | 1.98569 | 1.9872 | 1.98886 |
| νd | 17.29 | 17.37 | 17.37 | 17.32 | 17.31 | 17.29 | 17.29 | 17.2 | 17.19 | 17.19 |
| Specific gravity | 3.559 | 3.571 | 3.601 | 3.583 | 3.569 | 3.545 | 3.529 | 3.546 | 3.548 | 3.558 |
| Tg(° C.) | 668 | 656 | 664 | 670 | 666 | 656 | 650 | 673 | 670 | 665 |
| λ70(nm) | 489 | 491 | 495 | 493 | 493 | 492 | 492 | 490 | 491 | 493 |
| λ5(nm) | 397 | 397 | 397 | 397 | 397 | 397 | 397 | 397 | 397 | 397 |
| nd/specific gravity | 0.56 | 0.56 | 0.55 | 0.55 | 0.56 | 0.56 | 0.56 | 0.56 | 0.56 | 0.56 |

TABLE 3-2

| Sample | 41 | 42 | 43 | 44 | 45 | 46 | 47 | 48 | 49 | 50 | 51 |
|---|---|---|---|---|---|---|---|---|---|---|---|
| $P_2O_5$ + $TiO_2$ + $Nb_2O_5$ | 91.21 | 90.23 | 91.86 | 91.57 | 91.52 | 91.25 | 91.42 | 91.67 | 92.68 | 91.91 | 91.75 |
| SrO + BaO | 3.43 | 5.09 | 3.42 | 3.40 | 3.42 | 3.41 | 3.42 | 3.43 | 1.73 | 3.44 | 3.43 |
| MgO + CaO + ZnO + SrO + BaO | 5.31 | 6.33 | 4.67 | 4.64 | 4.67 | 4.66 | 4.67 | 4.06 | 3.00 | 4.70 | 4.69 |
| $Li_2O$ + $Na_2O$ + $K_2O$ + MgO + CaO + ZnO + SrO + BaO | 8.79 | 9.77 | 8.14 | 8.43 | 8.48 | 8.75 | 8.58 | 8.33 | 7.32 | 8.09 | 8.25 |
| $TiO_2$ + $Nb_2O_5$ | 64.64 | 63.95 | 65.36 | 65.24 | 65.03 | 64.39 | 64.51 | 64.69 | 65.40 | 64.85 | 64.74 |
| $TiO_2$ + $Nb_2O_5$ + $WO_3$ + $Bi_2O_3$ | 64.64 | 63.95 | 65.36 | 65.24 | 65.03 | 64.39 | 64.51 | 64.69 | 65.40 | 64.85 | 64.74 |
| $P_2O_5$/($P_2O_5$ + $TiO_2$ + $Nb_2O_5$) | 0.29 | 0.29 | 0.29 | 0.29 | 0.29 | 0.29 | 0.29 | 0.29 | 0.29 | 0.29 | 0.29 |
| $K_2O$/($Li_2O$ + $Na_2O$ + $K_2O$) | 0.76 | 0.76 | 0.76 | 0.69 | 0.69 | 0.77 | 0.81 | 0.74 | 0.74 | 0.62 | 0.59 |

TABLE 3-2-continued

| | | | | | | | | | | | |
|---|---|---|---|---|---|---|---|---|---|---|---|
| $TiO_2/(Li_2O + Na_2O + K_2O)$ | 5.77 | 5.77 | 6.03 | 4.78 | 5.02 | 4.90 | 5.12 | 4.71 | 4.71 | 5.94 | 5.64 |
| $(MgO + CaO + ZnO + SrO + BaO)/(Li_2O + Na_2O + K_2O)$ | 1.53 | 1.84 | 1.35 | 1.22 | 1.22 | 1.14 | 1.19 | 0.95 | 0.70 | 1.38 | 1.31 |
| $BaO/(MgO + CaO + ZnO + SrO + BaO)$ | 0.65 | 0.80 | 0.73 | 0.73 | 0.73 | 0.73 | 0.73 | 0.85 | 0.58 | 0.73 | 0.73 |
| $TiO_2/(MgO + CaO + ZnO + SrO + BaO)$ | 3.78 | 3.14 | 4.48 | 3.91 | 4.10 | 4.29 | 4.29 | 4.95 | 6.77 | 4.29 | 4.29 |
| $TiO_2/(TiO_2 + Nb_2O_5)$ | 0.31 | 0.31 | 0.32 | 0.28 | 0.29 | 0.31 | 0.31 | 0.31 | 0.31 | 0.31 | 0.31 |
| $TiO_2/(TiO_2 + Nb_2O_5 + WO_3 + Bi_2O_3)$ | 0.31 | 0.31 | 0.32 | 0.28 | 0.29 | 0.31 | 0.31 | 0.31 | 0.31 | 0.31 | 0.31 |
| $TiO_2/Nb_2O_5$ | 0.45 | 0.45 | 0.47 | 0.38 | 0.42 | 0.45 | 0.45 | 0.45 | 0.45 | 0.45 | 0.45 |
| $TiO_2/(Nb_2O_5 + WO_3 + Bi_2O_3)$ | 0.45 | 0.45 | 0.47 | 0.38 | 0.42 | 0.45 | 0.45 | 0.45 | 0.45 | 0.45 | 0.45 |
| $(Li_2O + Na_2O + MgO + CaO + ZnO + SrO)/(K_2O + BaO)$ | 0.45 | 0.27 | 0.35 | 0.40 | 0.40 | 0.33 | 0.31 | 0.26 | 0.49 | 0.46 | 0.49 |
| $(TiO_2 + Nb_2O_5)/(SiO_2 + B_2O_3 + Li_2O + Na_2O + K_2O + MgO + CaO + ZnO + SrO + BaO)$ | 7.36 | 6.55 | 8.03 | 7.74 | 7.67 | 7.36 | 7.51 | 7.77 | 8.93 | 8.02 | 7.84 |

| Sample | 52 | 53 | 54 | 55 | 56 | 57 | 58 | 59 | 60 |
|---|---|---|---|---|---|---|---|---|---|
| $P_2O_5 + TiO_2 + Nb_2O_5$ | 91.49 | 90.51 | 90.60 | 91.09 | 92.08 | 92.59 | 91.48 | 91.64 | 91.81 |
| $SrO + BaO$ | 3.42 | 5.08 | 5.08 | 4.26 | 2.58 | 1.73 | 3.39 | 3.40 | 3.40 |
| $MgO + CaO + ZnO + SrO + BaO$ | 5.30 | 6.32 | 5.70 | 5.19 | 4.16 | 3.63 | 4.63 | 4.64 | 4.65 |
| $Li_2O + Na_2O + K_2O + MgO + CaO + ZnO + SrO + BaO$ | 8.51 | 9.49 | 9.40 | 8.91 | 7.92 | 7.41 | 8.52 | 8.36 | 8.19 |
| $TiO_2 + Nb_2O_5$ | 64.56 | 63.86 | 63.93 | 64.27 | 64.97 | 65.33 | 64.81 | 64.93 | 65.04 |
| $TiO_2 + Nb_2O_5 + WO_3 + Bi_2O_3$ | 64.56 | 63.86 | 63.93 | 64.27 | 64.97 | 65.33 | 64.81 | 64.93 | 65.04 |
| $P_2O_5/(P_2O_5 + TiO_2 + Nb_2O_5)$ | 0.29 | 0.29 | 0.29 | 0.29 | 0.29 | 0.29 | 0.29 | 0.29 | 0.29 |
| $K_2O/(Li_2O + Na_2O + K_2O)$ | 0.65 | 0.65 | 0.70 | 0.70 | 0.70 | 0.70 | 0.80 | 0.84 | 0.74 |
| $TiO_2/(Li_2O + Na_2O + K_2O)$ | 6.25 | 6.25 | 5.37 | 5.37 | 5.37 | 5.37 | 5.33 | 5.59 | 5.87 |
| $(MgO + CaO + ZnO + SrO + BaO)/(Li_2O + Na_2O + K_2O)$ | 1.65 | 1.99 | 1.54 | 1.40 | 1.11 | 0.96 | 1.19 | 1.25 | 1.31 |
| $BaO/(MgO + CaO + ZnO + SrO + BaO)$ | 0.65 | 0.80 | 0.89 | 0.82 | 0.62 | 0.48 | 0.73 | 0.73 | 0.73 |
| $TiO_2/(MgO + CaO + ZnO + SrO + BaO)$ | 3.78 | 3.14 | 3.48 | 3.84 | 4.85 | 5.59 | 4.48 | 4.48 | 4.48 |
| $TiO_2/(TiO_2 + Nb_2O_5)$ | 0.31 | 0.31 | 0.31 | 0.31 | 0.31 | 0.31 | 0.32 | 0.32 | 0.32 |
| $TiO_2/(TiO_2 + Nb_2O_5 + WO_3 + Bi_2O_3)$ | 0.31 | 0.31 | 0.31 | 0.31 | 0.31 | 0.31 | 0.32 | 0.32 | 0.32 |
| $TiO_2/Nb_2O_5$ | 0.45 | 0.45 | 0.45 | 0.45 | 0.45 | 0.45 | 0.47 | 0.47 | 0.47 |
| $TiO_2/(Nb_2O_5 + WO_3 + Bi_2O_3)$ | 0.45 | 0.45 | 0.45 | 0.45 | 0.45 | 0.45 | 0.47 | 0.47 | 0.47 |
| $(Li_2O + Na_2O + MgO + CaO + ZnO + SrO)/(K_2O + BaO)$ | 0.54 | 0.33 | 0.22 | 0.30 | 0.51 | 0.69 | 0.31 | 0.28 | 0.36 |
| $(TiO_2 + Nb_2O_5)/(SiO_2 + B_2O_3 + Li_2O + Na_2O + K_2O + MgO + CaO + ZnO + SrO + BaO)$ | 7.58 | 6.73 | 6.80 | 7.21 | 8.20 | 8.81 | 7.61 | 7.77 | 7.94 |

TABLE 4-1

| Sample | 61 | 62 | 63 | 64 | 65 | 66 | 67 | 68 | 69 | 70 |
|---|---|---|---|---|---|---|---|---|---|---|
| $P_2O_5$ | 26.79 | 27.17 | 27.20 | 26.36 | 26.11 | 26.39 | 26.96 | 25.95 | 25.99 | 26.02 |
| $SiO_2$ | 0.00 | 0.00 | 0.00 | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 | 0.00 | 0.00 | 0.00 |
| $Al_2O_3$ | 0.00 | 0.00 | 0.00 | 0.00 | 0.00 | 0.00 | 0.00 | 0.00 | 0.00 | 0.00 |
| $Li_2O$ | 0.25 | 0.17 | 0.25 | 0.08 | 0.08 | 0.08 | 0.08 | 0.08 | 0.08 | 0.08 |
| $Na_2O$ | 0.69 | 0.69 | 0.52 | 0.68 | 0.67 | 0.68 | 0.69 | 0.33 | 0.67 | 0.67 |
| $K_2O$ | 3.14 | 3.14 | 3.14 | 3.09 | 3.06 | 3.09 | 3.16 | 3.04 | 2.54 | 3.05 |
| MgO | 0.00 | 0.00 | 0.00 | 0.00 | 0.00 | 0.00 | 0.00 | 0.00 | 0.00 | 0.00 |
| CaO | 0.62 | 1.24 | 1.25 | 1.23 | 0.00 | 0.61 | 1.88 | 0.60 | 0.60 | 0.00 |
| SrO | 0.00 | 0.00 | 0.00 | 0.00 | 0.00 | 0.00 | 0.00 | 0.00 | 0.00 | 0.00 |
| BaO | 3.40 | 3.40 | 3.41 | 3.35 | 6.64 | 5.03 | 1.71 | 4.95 | 4.95 | 4.96 |

TABLE 4-1-continued

| | | | | | | | | | | |
|---|---|---|---|---|---|---|---|---|---|---|
| ZnO | 0.00 | 0.00 | 0.00 | 0.00 | 0.00 | 0.00 | 0.00 | 0.00 | 0.00 | 0.00 |
| $TiO_2$ | 20.84 | 19.94 | 19.96 | 18.76 | 20.31 | 20.52 | 20.97 | 19.32 | 19.36 | 19.37 |
| $Nb_2O_5$ | 44.27 | 44.25 | 44.29 | 46.46 | 43.14 | 43.60 | 44.55 | 45.73 | 45.81 | 45.85 |
| $ZrO_2$ | 0.00 | 0.00 | 0.00 | 0.00 | 0.00 | 0.00 | 0.00 | 0.00 | 0.00 | 0.00 |
| $Bi_2O_3$ | 0.00 | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 | 0.00 | 0.00 |
| $Sb_2O_3$ | 0.00 | 0.00 | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 | 100.00 | 100.00 |
| $Al_2O_3 + SiO_2$ | 0.00 | 0.00 | 0.00 | 0.00 | 0.00 | 0.00 | 0.00 | 0.00 | 0.00 | 0.00 |
| $Li_2O + Na_2O + K_2O$ | 4.07 | 3.99 | 3.90 | 3.85 | 3.81 | 3.85 | 3.93 | 3.45 | 3.28 | 3.80 |
| ZnO + SrO + BaO | 3.40 | 3.40 | 3.41 | 3.35 | 6.64 | 5.03 | 1.71 | 4.95 | 4.95 | 4.96 |
| nd | 1.9867 | 1.97902 | 1.97988 | 1.98609 | 1.9855 | 1.98561 | 1.98529 | 1.99136 | 1.99303 | 1.9906 |
| νd | 17.13 | 17.36 | 17.35 | 17.26 | 17.26 | 17.23 | 17.19 | 17.18 | 17.16 | 17.07 |
| Specific gravity | 3.547 | 3.539 | 3.542 | 3.569 | 3.606 | 3.577 | 3.525 | 3.596 | 3.607 | 3.595 |
| Tg(° C.) | 672 | 676 | 673 | 680 | 687 | 675 | 674 | 684 | 681 | 682 |
| λ70(nm) | 492 | 481 | 484 | 498 | 497 | 495 | 498 | 490 | 493 | 494 |
| λ5(nm) | 397 | 396 | 396 | 396 | 397 | 397 | 397 | 397 | 397 | 397 |
| nd/specific gravity | 0.56 | 0.56 | 0.56 | 0.56 | 0.55 | 0.56 | 0.56 | 0.55 | 0.55 | 0.55 |

| Sample | 71 | 72 | 73 | 74 | 75 | 76 | 77 | 78 | 79 | 80 |
|---|---|---|---|---|---|---|---|---|---|---|
| $P_2O_5$ | 25.55 | 25.73 | 25.32 | 25.58 | 25.60 | 25.24 | 25.63 | 24.72 | 24.92 | 25.92 |
| $SiO_2$ | 0.00 | 0.00 | 0.00 | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 | 0.00 | 0.00 | 0.00 |
| $Al_2O_3$ | 0.00 | 0.00 | 0.00 | 0.00 | 0.00 | 0.00 | 0.00 | 0.00 | 0.00 | 0.00 |
| $Li_2O$ | 0.08 | 0.08 | 0.08 | 0.08 | 0.08 | 0.16 | 0.24 | 0.08 | 0.08 | 0.24 |
| $Na_2O$ | 0.00 | 0.33 | 0.00 | 0.00 | 0.00 | 0.00 | 0.00 | 0.00 | 0.00 | 0.00 |
| $K_2O$ | 2.99 | 2.51 | 2.47 | 2.50 | 3.00 | 3.00 | 2.50 | 3.48 | 2.96 | 3.04 |
| MgO | 0.00 | 0.00 | 0.00 | 0.00 | 0.00 | 0.00 | 0.00 | 0.00 | 0.00 | 0.00 |
| CaO | 0.00 | 0.00 | 0.00 | 0.59 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 6.49 | 6.54 | 6.43 | 4.88 | 4.88 | 6.51 | 6.51 | 6.47 | 7.23 | 4.94 |
| ZnO | 0.00 | 0.00 | 0.00 | 0.00 | 0.00 | 0.00 | 0.00 | 0.00 | 0.00 | 0.00 |
| $TiO_2$ | 19.87 | 20.87 | 19.69 | 19.89 | 19.91 | 19.93 | 19.94 | 18.96 | 18.84 | 20.16 |
| $Nb_2O_5$ | 45.02 | 43.94 | 46.01 | 46.49 | 46.53 | 45.16 | 45.18 | 46.29 | 45.97 | 45.69 |
| $ZrO_2$ | 0.00 | 0.00 | 0.00 | 0.00 | 0.00 | 0.00 | 0.00 | 0.00 | 0.00 | 0.00 |
| $Bi_2O_3$ | 0.00 | 0.00 | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 | 0.00 | 0.00 |
| $Sb_2O_3$ | 0.00 | 0.00 | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 | 100.00 | 100.00 |
| $Al_2O_3 + SiO_2$ | 0.00 | 0.00 | 0.00 | 0.00 | 0.00 | 0.00 | 0.00 | 0.00 | 0.00 | 0.00 |
| $Li_2O + Na_2O + K_2O$ | 3.07 | 2.92 | 2.55 | 2.58 | 3.08 | 3.16 | 2.74 | 3.56 | 3.04 | 3.28 |
| ZnO + SrO + BaO | 6.49 | 6.54 | 6.43 | 4.88 | 4.88 | 6.51 | 6.51 | 6.47 | 7.23 | 4.94 |
| nd | 1.9963 | 1.9981 | 2.00335 | 2.0035 | 2.00106 | 1.99931 | 1.9996 | 1.99826 | 1.99823 | 1.99759 |
| νd | 17.08 | 17.04 | 17 | 16.97 | 16.93 | 17.06 | 17.06 | 17.08 | 17.15 | 16.98 |
| Specific gravity | 3.628 | 3.625 | 3.64 | 3.611 | 3.604 | 3.633 | 3.633 | 3.65 | 3.664 | 3.596 |
| Tg(° C.) | 687 | 684 | 682 | 683 | 689 | 685 | 676 | 692 | 690 | 680 |
| λ70(nm) | 497 | 498 | 503 | 510 | 507 | 505 | 505 | 508 | 506 | 505 |
| λ5(nm) | 397 | 398 | 398 | 398 | 398 | 398 | 399 | 399 | 398 | 398 |
| nd/specific gravity | 0.55 | 0.55 | 0.55 | 0.55 | 0.56 | 0.55 | 0.55 | 0.55 | 0.55 | 0.56 |

TABLE 4-2

| Sample | 60 | 61 | 62 | 63 | 64 | 65 | 66 | 67 | 68 | 69 | 70 |
|---|---|---|---|---|---|---|---|---|---|---|---|
| $P_2O_5 + TiO_2 + Nb_2O_5$ | 91.81 | 91.90 | 91.36 | 91.44 | 91.58 | 89.56 | 90.51 | 92.47 | 91.00 | 91.16 | 91.25 |
| SrO + BaO | 3.40 | 3.40 | 3.40 | 3.41 | 3.35 | 6.64 | 5.03 | 1.71 | 4.95 | 4.95 | 4.96 |
| MgO + CaO + ZnO + SrO + BaO | 4.65 | 4.03 | 4.65 | 4.65 | 4.58 | 6.64 | 5.64 | 3.59 | 5.55 | 5.56 | 4.96 |
| $Li_2O + Na_2O + K_2O$ + MgO + CaO + ZnO + SrO + BaO | 8.19 | 8.10 | 8.64 | 8.56 | 8.42 | 10.44 | 9.49 | 7.53 | 9.00 | 8.84 | 8.75 |
| $TiO_2 + Nb_2O_5$ | 65.04 | 65.11 | 64.19 | 64.25 | 65.22 | 63.45 | 64.12 | 65.51 | 65.05 | 65.17 | 65.23 |
| $TiO_2 + Nb_2O_5 + WO_3 + Bi_2O_3$ | 65.04 | 65.11 | 64.19 | 64.25 | 65.22 | 63.45 | 64.12 | 65.51 | 65.05 | 65.17 | 65.23 |
| $P_2O_5/(P_2O_5 + TiO_2 + Nb_2O_5)$ | 0.29 | 0.29 | 0.30 | 0.30 | 0.29 | 0.29 | 0.29 | 0.29 | 0.29 | 0.29 | 0.29 |
| $K_2O/(Li_2O + Na_2O + K_2O)$ | 0.74 | 0.77 | 0.79 | 0.80 | 0.80 | 0.80 | 0.80 | 0.80 | 0.88 | 0.77 | 0.80 |
| $TiO_2/(Li_2O + Na_2O + K_2O)$ | 5.87 | 5.11 | 5.00 | 5.11 | 4.88 | 5.33 | 5.33 | 5.33 | 5.60 | 5.89 | 5.10 |

TABLE 4-2-continued

| | | | | | | | | | | | |
|---|---|---|---|---|---|---|---|---|---|---|---|
| (MgO + CaO + ZnO + SrO + BaO)/($Li_2O$ + $Na_2O$ + $K_2O$) | 1.31 | 0.99 | 1.16 | 1.19 | 1.19 | 1.74 | 1.47 | 0.91 | 1.61 | 1.69 | 1.31 |
| BaO/(MgO + CaO + ZnO + SrO + BaO) | 0.73 | 0.85 | 0.73 | 0.73 | 0.73 | 1.00 | 0.89 | 0.48 | 0.89 | 0.89 | 1.00 |
| $TiO_2$/(MgO + CaO + ZnO + SrO + BaO) | 4.48 | 5.17 | 4.29 | 4.29 | 4.10 | 3.06 | 3.64 | 5.84 | 3.48 | 3.48 | 3.91 |
| $TiO_2$/($TiO_2$ + $Nb_2O_5$) | 0.32 | 0.32 | 0.31 | 0.31 | 0.29 | 0.32 | 0.32 | 0.32 | 0.30 | 0.30 | 0.30 |
| $TiO_2$/($TiO_2$ + $Nb_2O_5$ + $WO_3$ + $Bi_2O_3$) | 0.32 | 0.32 | 0.31 | 0.31 | 0.29 | 0.32 | 0.32 | 0.32 | 0.30 | 0.30 | 0.30 |
| $TiO_2$/$Nb_2O_5$ | 0.47 | 0.47 | 0.45 | 0.45 | 0.40 | 0.47 | 0.47 | 0.47 | 0.42 | 0.42 | 0.42 |
| $TiO_2$/($Nb_2O_5$ + $WO_3$ + $Bi_2O_3$) | 0.47 | 0.47 | 0.45 | 0.45 | 0.40 | 0.47 | 0.47 | 0.47 | 0.42 | 0.42 | 0.42 |
| ($Li_2O$ + $Na_2O$ + MgO + CaO + ZnO + SrO)/($K_2O$ + BaO) | 0.36 | 0.24 | 0.32 | 0.31 | 0.31 | 0.08 | 0.17 | 0.55 | 0.13 | 0.18 | 0.09 |
| ($TiO_2$ + $Nb_2O_5$)/($SiO_2$ + $B_2O_3$ + $Li_2O$ + $Na_2O$ + $K_2O$ + MgO + CaO + ZnO + SrO + BaO) | 7.94 | 8.04 | 7.43 | 7.51 | 7.74 | 6.07 | 6.76 | 8.71 | 7.23 | 7.37 | 7.45 |

| Sample | 71 | 72 | 73 | 74 | 75 | 76 | 77 | 78 | 79 | 80 |
|---|---|---|---|---|---|---|---|---|---|---|
| $P_2O_5$ + $TiO_2$ + $Nb_2O_5$ | 90.44 | 90.54 | 91.02 | 91.96 | 92.04 | 90.33 | 90.75 | 89.97 | 89.73 | 91.78 |
| SrO + BaO | 6.49 | 6.54 | 6.43 | 4.88 | 4.88 | 6.51 | 6.51 | 6.47 | 7.23 | 4.94 |
| MgO + CaO + ZnO + SrO + BaO | 6.49 | 6.54 | 6.43 | 5.47 | 4.88 | 6.51 | 6.51 | 6.47 | 7.23 | 4.94 |
| $Li_2O$ + $Na_2O$ + $K_2O$ + MgO + CaO + ZnO + SrO + BaO | 9.56 | 9.46 | 8.98 | 8.04 | 7.96 | 9.67 | 9.25 | 10.03 | 10.27 | 8.22 |
| $TiO_2$ + $Nb_2O_5$ | 64.89 | 64.80 | 65.70 | 66.38 | 66.44 | 65.08 | 65.11 | 65.25 | 64.81 | 65.86 |
| $TiO_2$ + $Nb_2O_5$ + $WO_3$ + $Bi_2O_3$ | 64.89 | 64.80 | 65.70 | 66.38 | 66.44 | 65.08 | 65.11 | 65.25 | 64.81 | 65.86 |
| $P_2O_5$/($P_2O_5$ + $TiO_2$ + $Nb_2O_5$) | 0.28 | 0.28 | 0.28 | 0.28 | 0.28 | 0.28 | 0.28 | 0.27 | 0.28 | 0.28 |
| $K_2O$/($Li_2O$ + $Na_2O$ + $K_2O$) | 0.97 | 0.86 | 0.97 | 0.97 | 0.97 | 0.95 | 0.91 | 0.98 | 0.97 | 0.93 |
| $TiO_2$/($Li_2O$ + $Na_2O$ + $K_2O$) | 6.47 | 7.14 | 7.72 | 7.72 | 6.47 | 6.31 | 7.28 | 5.33 | 6.20 | 6.15 |
| (MgO + CaO + ZnO + SrO + BaO)/($Li_2O$ + $Na_2O$ + $K_2O$) | 2.11 | 2.24 | 2.52 | 2.12 | 1.59 | 2.06 | 2.38 | 1.82 | 2.38 | 1.51 |
| BaO/(MgO + CaO + ZnO + SrO + BaO) | 1.00 | 1.00 | 1.00 | 0.89 | 1.00 | 1.00 | 1.00 | 1.00 | 1.00 | 1.00 |
| $TiO_2$/(MgO + CaO + ZnO + SrO + BaO) | 3.06 | 3.19 | 3.06 | 3.64 | 4.08 | 3.06 | 3.06 | 2.93 | 2.60 | 4.08 |
| $TiO_2$/($TiO_2$ + $Nb_2O_5$) | 0.31 | 0.32 | 0.30 | 0.30 | 0.30 | 0.31 | 0.31 | 0.29 | 0.29 | 0.31 |
| $TiO_2$/($TiO_2$ + $Nb_2O_5$ + $WO_3$ + $Bi_2O_3$) | 0.31 | 0.32 | 0.30 | 0.30 | 0.30 | 0.31 | 0.31 | 0.29 | 0.29 | 0.31 |
| $TiO_2$/$Nb_2O_5$ | 0.44 | 0.47 | 0.43 | 0.43 | 0.43 | 0.44 | 0.44 | 0.41 | 0.41 | 0.44 |
| $TiO_2$/($Nb_2O_5$ + $WO_3$ + $Bi_2O_3$) | 0.44 | 0.47 | 0.43 | 0.43 | 0.43 | 0.44 | 0.44 | 0.41 | 0.41 | 0.44 |
| ($Li_2O$ + $Na_2O$ + MgO + CaO + ZnO + SrO)/($K_2O$ + BaO) | 0.01 | 0.05 | 0.01 | 0.09 | 0.01 | 0.02 | 0.03 | 0.0 | 0.01 | 0.03 |
| ($TiO_2$ + $Nb_2O_5$)/($SiO_2$ + $B_2O_3$ + $Li_2O$ + $Na_2O$ + $K_2O$ + MgO + CaO + ZnO + SrO + BaO) | 6.79 | 6.85 | 7.31 | 8.25 | 8.35 | 6.73 | 7.04 | 6.51 | 6.31 | 8.01 |

TABLE 5-1

| Sample | 81 | 82 | 83 | 84 | 85 | 86 | 87 | 88 |
|---|---|---|---|---|---|---|---|---|
| $P_2O_5$ | 25.81 | 25.33 | 25.51 | 25.45 | 25.42 | 25.40 | 25.47 | 25.33 |
| $SiO_2$ | 0.00 | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 | 0.00 |
| $Al_2O_3$ | 0.00 | 0.00 | 0.00 | 0.00 | 0.00 | 0.00 | 0.00 | 0.00 |
| $Li_2O$ | 0.08 | 0.08 | 0.06 | 0.03 | 0.02 | 0.01 | 0.01 | 0.01 |
| $Na_2O$ | 0.00 | 0.00 | 0.00 | 0.00 | 0.00 | 0.00 | 0.00 | 0.00 |
| $K_2O$ | 3.02 | 2.97 | 2.99 | 2.98 | 2.98 | 2.97 | 3.11 | 2.84 |
| MgO | 0.00 | 0.00 | 0.00 | 0.00 | 0.00 | 0.00 | 0.00 | 0.00 |
| CaO | 0.60 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 |
| BaO | 4.92 | 4.83 | 6.48 | 6.47 | 6.46 | 6.46 | 6.07 | 6.84 |
| ZnO | 0.00 | 0.00 | 0.00 | 0.00 | 0.00 | 0.00 | 0.00 | 0.00 |
| $TiO_2$ | 20.08 | 19.70 | 19.84 | 19.79 | 19.77 | 19.76 | 19.81 | 19.70 |

TABLE 5-1-continued

| | | | | | | | | |
|---|---|---|---|---|---|---|---|---|
| $Nb_2O_5$ | 45.49 | 44.65 | 45.11 | 45.28 | 45.36 | 45.40 | 45.53 | 45.27 |
| $ZrO_2$ | 0.00 | 0.00 | 0.00 | 0.00 | 0.00 | 0.00 | 0.00 | 0.00 |
| $Bi_2O_3$ | 0.00 | 0.00 | 0.00 | 0.00 | 0.00 | 0.00 | 0.00 | 0.00 |
| $WO_3$ | 0.00 | 2.43 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 |
| $Sb_2O_3$ | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |
| $Al_2O_3 + SiO_2$ | 0.00 | 0.00 | 0.00 | 0.00 | 0.00 | 0.00 | 0.00 | 0.00 |
| $Li_2O + Na_2O + K_2O$ | 3.10 | 3.05 | 3.05 | 3.01 | 2.99 | 2.98 | 3.12 | 2.85 |
| ZnO + SrO + BaO | 4.92 | 4.83 | 6.48 | 6.47 | 6.46 | 6.46 | 6.07 | 6.84 |
| nd | 1.99602 | 1.99968 | 1.99608 | 1.99676 | 1.99724 | 1.99718 | 1.99648 | 1.99767 |
| νd | 17.06 | 16.91 | 17.09 | 17.07 | 17.06 | 17.06 | 17.03 | 17.07 |
| Specific gravity | 3.601 | 3.633 | 3.624 | 3.625 | 3.632 | 3.633 | 3.617 | 3.639 |
| Tg(° C.) | 688 | 687 | 684 | 692 | 692 | 690 | 689 | 694 |
| λ70(nm) | 497 | 52 | 560 | 511 | 506 | 504 | 508 | 508 |
| λ5(nm) | 398 | 401 | 399 | 399 | 399 | 399 | 399 | 399 |
| nd/specific gravity | 0.55 | 0.55 | 0.55 | 0.55 | 0.55 | 0.55 | 0.55 | 0.55 |

| Sample | 89 | 90 | 91 | 92 | 93 | 94 | 95 | 96 |
|---|---|---|---|---|---|---|---|---|
| $P_2O_5$ | 25.26 | 25.19 | 25.32 | 25.24 | 24.28 | 24.04 | 23.51 | 22.26 |
| $SiO_2$ | 0.00 | 0.00 | 0.32 | 0.63 | 0.00 | 0.00 | 0.00 | 0.00 |
| $B_2O_3$ | 0.00 | 0.00 | 0.00 | 0.00 | 0.00 | 0.00 | 0.70 | 1.40 |
| $Al_2O_3$ | 0.00 | 0.00 | 0.00 | 0.00 | 0.00 | 0.00 | 0.00 | 0.00 |
| $Li_2O$ | 0.01 | 0.01 | 0.01 | 0.01 | 0.08 | 0.08 | 0.07 | 0.08 |
| $Na_2O$ | 0.00 | 0.00 | 0.00 | 0.00 | 0.00 | 0.00 | 0.00 | 0.00 |
| $K_2O$ | 2.71 | 2.58 | 2.97 | 2.96 | 3.62 | 3.15 | 0.00 | 0.00 |
| MgO | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 |
| BaO | 7.22 | 7.60 | 6.44 | 6.42 | 0.80 | 2.21 | 11.82 | 11.90 |
| ZnO | 0.00 | 0.00 | 0.00 | 0.00 | 0.00 | 0.00 | 0.00 | 0.00 |
| $TiO_2$ | 19.65 | 19.59 | 19.70 | 19.63 | 25.01 | 24.77 | 24.08 | 24.25 |
| $Nb_2O_5$ | 45.15 | 45.02 | 45.26 | 45.12 | 30.51 | 30.24 | 29.37 | 29.59 |
| $ZrO_2$ | 0.00 | 0.00 | 0.00 | 0.00 | 0.00 | 0.00 | 0.00 | 0.00 |
| $Bi_2O_3$ | 0.00 | 0.00 | 0.00 | 0.00 | 4.85 | 4.80 | 0.00 | 0.00 |
| $WO_3$ | 0.00 | 0.00 | 0.00 | 0.00 | 10.85 | 10.72 | 10.44 | 10.52 |
| $Y_2O_3$ | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 |
| $Sb_2O_3$ | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |
| $Al_2O_3 + SiO_2$ | 0.00 | 0.00 | 0.32 | 0.63 | 0.00 | 0.00 | 0.00 | 0.00 |
| $Li_2O + Na_2O + K_2O$ | 2.72 | 2.59 | 2.97 | 2.96 | 3.70 | 3.23 | 0.07 | 0.08 |
| ZnO + SrO + BaO | 7.22 | 7.60 | 6.44 | 6.42 | 0.80 | 2.21 | 11.82 | 11.90 |
| nd | 1.99806 | 1.99864 | 1.99469 | 1.99171 | 2.0113 | 2.01368 | 2.01205 | 2.01814 |
| νd | 17.08 | 17.11 | 17.14 | 17.19 | 16.35 | 16.43 | 16.96 | 16.96 |
| Specific gravity | 3.65 | 3.661 | 3.626 | 3.619 | 3.718 | 3.754 | 3.867 | 3.888 |
| Tg(° C.) | 693 | 694 | 693 | 693 | 641 | 641 | 668 | 654 |
| λ70(nm) | 509 | 506 | 514 | 492 | 535 | 534 | 585 | 540 |
| λ5(nm) | 399 | 399 | 399 | 398 | 409 | 409 | 408 | 408 |
| nd/specific gravity | 0.55 | 0.55 | 0.55 | 0.55 | 0.54 | 0.54 | 0.52 | 0.52 |

| Sample | 97 | 98 | 99 | 100 | 101 | 102 |
|---|---|---|---|---|---|---|
| $P_2O_5$ | 25.12 | 25.63 | 25.41 | 25.48 | 25.28 | 25.35 |
| $SiO_2$ | 0.00 | 0.00 | 0.00 | 0.00 | 0.00 | 0 |
| $B_2O_3$ | 0.00 | 0.00 | 0.00 | 0.00 | 0.00 | 0 |
| $Al_2O_3$ | 0.00 | 0.00 | 0.00 | 0.00 | 0.00 | 0 |
| $Li_2O$ | 0.08 | 0.08 | 0.08 | 0.08 | 0.08 | 0.08 |
| $Na_2O$ | 0.00 | 0.00 | 0.00 | 0.00 | 0.00 | 0 |
| $K_2O$ | 2.21 | 3.50 | 2.73 | 2.74 | 2.71 | 2.72 |
| MgO | 0.00 | 0.00 | 0.00 | 0.00 | 0.00 | 0 |
| CaO | 0.00 | 0.00 | 0.00 | 0.00 | 0.00 | 0 |
| SrO | 0.00 | 0.00 | 0.00 | 0.00 | 0.00 | 0 |
| BaO | 8.78 | 6.52 | 6.46 | 6.48 | 6.43 | 6.44 |
| ZnO | 0.00 | 0.00 | 0.00 | 0.00 | 0.00 | 0 |
| $TiO_2$ | 19.54 | 19.09 | 19.34 | 19.82 | 19.24 | 19.72 |
| $Nb_2O_5$ | 44.27 | 45.18 | 44.79 | 44.21 | 44.55 | 43.98 |
| $ZrO_2$ | 0.00 | 0.00 | 0.00 | 0.00 | 0.00 | 0 |
| $Bi_2O_3$ | 0.00 | 0.00 | 0.00 | 0.00 | 0.00 | 0 |
| $WO_3$ | 0.00 | 0.00 | 0.00 | 0.00 | 0.00 | 0 |
| $Y_2O_3$ | 0.00 | 0.00 | 1.19 | 1.19 | 0.00 | 0 |
| $La_2O_3$ | 0.00 | 0.00 | 0.00 | 0.00 | 1.71 | 1.71 |
| $Sb_2O_3$ | 0.00 | 0.00 | 0.00 | 0.00 | 0.00 | 0 |
| Total | 100.00 | 100.00 | 100.00 | 100.00 | 100.00 | 100.00 |
| $Al_2O_3 + SiO_2$ | 0.00 | 0.00 | 0.00 | 0.00 | 0.00 | 0 |

TABLE 5-1-continued

| | | | | | | |
|---|---|---|---|---|---|---|
| $Li_2O + Na_2O + K_2O$ | 2.29 | 3.58 | 2.81 | 2.82 | 2.79 | 2.8 |
| ZnO + SrO + BaO | 8.78 | 6.52 | 6.46 | 6.48 | 6.43 | 6.44 |
| nd | 1.99973 | 1.98938 | 1.99394 | 1.99392 | 1.99625 | 1.99622 |
| vd | 17.2 | 17.21 | 17.3 | 17.27 | 17.28 | 17.28 |
| Specific gravity | 3.69 | 3.616 | 3.643 | 3.639 | 3.699 | 3.666 |
| Tg(° C.) | 693 | 695 | 684 | 685 | 696 | 685 |
| λ70(nm) | 496 | 497 | 499 | 504 | 505 | 499 |
| λ5(nm) | 399 | 398 | 398 | 398 | 398 | 398 |
| nd/specific gravity | 0.54 | 0.55 | 0.55 | 0.55 | 0.54 | 0.54 |

TABLE 5-2

| Sample | 81 | 82 | 83 | 84 | 85 | 86 | 87 | 88 | 89 | 90 | 91 | 92 |
|---|---|---|---|---|---|---|---|---|---|---|---|---|
| $P_2O_5 + TiO_2 + Nb_2O_5$ | 91.38 | 89.69 | 90.46 | 90.52 | 90.55 | 90.56 | 90.81 | 90.31 | 90.06 | 89.81 | 90.28 | 89.99 |
| SrO + BaO | 4.92 | 4.83 | 6.48 | 6.47 | 6.46 | 6.46 | 6.07 | 6.84 | 7.22 | 7.60 | 6.44 | 6.42 |
| MgO + CaO + ZnO + SrO + BaO | 5.52 | 4.83 | 6.48 | 6.47 | 6.46 | 6.46 | 6.07 | 6.84 | 7.22 | 7.60 | 6.44 | 6.42 |
| $Li_2O + Na_2O + K_2O$ + MgO + CaO + ZnO + SrO + BaO | 8.62 | 7.87 | 9.54 | 9.48 | 9.45 | 9.44 | 9.19 | 9.69 | 9.94 | 10.19 | 9.41 | 9.38 |
| $TiO_2 + Nb_2O_5$ | 65.57 | 64.36 | 64.95 | 65.07 | 65.13 | 65.16 | 65.34 | 64.98 | 64.80 | 64.62 | 64.95 | 64.75 |
| $TiO_2 + Nb_2O_5 + WO_3 + Bi_2O_3$ | 65.57 | 66.79 | 64.95 | 65.07 | 65.13 | 65.16 | 65.34 | 64.98 | 64.80 | 64.62 | 64.95 | 64.75 |
| $P_2O_5/(P_2O_5 + TiO_2 + Nb_2O_5)$ | 0.28 | 0.28 | 0.28 | 0.28 | 0.28 | 0.28 | 0.28 | 0.28 | 0.28 | 0.28 | 0.28 | 0.28 |
| $K_2O/(Li_2O + Na_2O + K_2O)$ | 0.97 | 0.97 | 0.98 | 0.99 | 0.99 | 1.00 | 1.00 | 1.00 | 1.00 | 1.00 | 1.00 | 1.00 |
| $TiO_2/(Li_2O + Na_2O + K_2O)$ | 6.47 | 6.47 | 6.50 | 6.57 | 6.61 | 6.62 | 6.36 | 6.91 | 7.22 | 7.57 | 6.62 | 6.62 |
| (MgO + CaO + ZnO + SrO + BaO)/($Li_2O + Na_2O + K_2O$) | 1.78 | 1.59 | 2.13 | 2.15 | 2.16 | 2.16 | 1.95 | 2.40 | 2.66 | 2.94 | 2.16 | 2.16 |
| BaO/(MgO + CaO + ZnO + SrO + BaO) | 0.89 | 1.00 | 1.00 | 1.00 | 1.00 | 1.00 | 1.00 | 1.00 | 1.00 | 1.00 | 1.00 | 1.00 |
| $TiO_2$/(MgO + CaO + ZnO + SrO + BaO) | 3.64 | 4.08 | 3.06 | 3.06 | 3.06 | 3.06 | 3.26 | 2.88 | 2.72 | 2.58 | 3.06 | 3.06 |
| $TiO_2/(TiO_2 + Nb_2O_5)$ | 0.31 | 0.31 | 0.31 | 0.30 | 0.30 | 0.30 | 0.30 | 0.30 | 0.30 | 0.30 | 0.30 | 0.30 |
| $TiO_2/(TiO_2 + Nb_2O_5 + WO_3 + Bi_2O_3)$ | 0.31 | 0.30 | 0.31 | 0.30 | 0.30 | 0.30 | 0.30 | 0.30 | 0.30 | 0.30 | 0.30 | 0.30 |
| $TiO_2/Nb_2O_5$ | 0.44 | 0.44 | 0.44 | 0.44 | 0.44 | 0.44 | 0.44 | 0.44 | 0.44 | 0.44 | 0.44 | 0.44 |
| $TiO_2/(Nb_2O_5 + WO_3 + Bi_2O_3)$ | 0.44 | 0.42 | 0.44 | 0.44 | 0.44 | 0.44 | 0.44 | 0.44 | 0.44 | 0.44 | 0.44 | 0.44 |
| ($Li_2O + Na_2O$ + MgO + CaO + ZnO + SrO)/($K_2O$ + BaO) | 0.09 | 0.01 | 0.01 | 0.00 | 0.00 | 0.00 | 0.00 | 0.00 | 0.00 | 0.00 | 0.00 | 0.00 |
| ($TiO_2 + Nb_2O_5$)/($SiO_2 + B_2O_3 + Li_2O + Na_2O + K_2O$ + MgO + CaO + ZnO + SrO + BaO) | 7.60 | 8.17 | 6.81 | 6.86 | 6.89 | 6.90 | 7.11 | 6.70 | 6.52 | 6.34 | 6.68 | 6.47 |

| Sample | 93 | 94 | 95 | 96 | 97 | 98 | 99 | 100 | 101 | 102 |
|---|---|---|---|---|---|---|---|---|---|---|
| $P_2O_5 + TiO_2 + Nb_2O_5$ | 79.81 | 79.05 | 76.97 | 76.10 | 88.93 | 89.90 | 89.54 | 89.51 | 89.07 | 89.05 |
| SrO + BaO | 0.80 | 2.21 | 11.82 | 11.90 | 8.78 | 6.52 | 6.46 | 6.48 | 6.43 | 6.44 |
| MgO + CaO + ZnO + SrO + BaO | 0.80 | 2.21 | 11.82 | 11.90 | 8.78 | 6.52 | 6.46 | 6.48 | 6.43 | 6.44 |
| $Li_2O + Na_2O + K_2O$ + MgO + CaO + ZnO + SrO + BaO | 4.50 | 5.44 | 11.89 | 11.98 | 11.07 | 10.10 | 9.27 | 9.30 | 9.22 | 9.24 |
| $TiO_2 + Nb_2O_5$ | 55.53 | 55.01 | 53.45 | 53.84 | 63.81 | 64.27 | 64.13 | 64.03 | 63.79 | 63.70 |
| $TiO_2 + Nb_2O_5 + WO_3 + Bi_2O_3$ | 71.22 | 70.52 | 63.90 | 64.36 | 63.81 | 64.27 | 64.13 | 64.03 | 63.79 | 63.70 |
| $P_2O_5/(P_2O_5 + TiO_2 + Nb_2O_5)$ | 0.30 | 0.30 | 0.31 | 0.29 | 0.28 | 0.29 | 0.28 | 0.28 | 0.28 | 0.28 |
| $K_2O/(Li_2O + Na_2O + K_2O)$ | 0.98 | 0.98 | 0.00 | 0.00 | 0.97 | 0.98 | 0.97 | 0.97 | 0.97 | 0.97 |
| $TiO_2/(Li_2O + Na_2O + K_2O)$ | 6.76 | 7.67 | 322.01 | 322.01 | 8.53 | 5.33 | 6.88 | 7.03 | 6.90 | 7.04 |
| (MgO + CaO + ZnO + SrO + BaO)/($Li_2O + Na_2O + K_2O$) | 0.22 | 0.68 | 158.04 | 158.04 | 3.83 | 1.82 | 2.30 | 2.30 | 2.30 | 2.30 |
| BaO/(MgO + CaO + ZnO + SrO + BaO) | 1.00 | 1.00 | 1.00 | 1.00 | 1.00 | 1.00 | 1.00 | 1.00 | 1.00 | 1.00 |
| $TiO_2$/(MgO + CaO + ZnO + SrO + BaO) | 31.38 | 11.21 | 2.04 | 2.04 | 2.23 | 2.93 | 2.99 | 3.06 | 2.99 | 3.06 |
| $TiO_2/(TiO_2 + Nb_2O_5)$ | 0.45 | 0.45 | 0.45 | 0.45 | 0.31 | 0.30 | 0.30 | 0.31 | 0.30 | 0.31 |

TABLE 5-2-continued

| | | | | | | | | | | |
|---|---|---|---|---|---|---|---|---|---|---|
| $TiO_2/(TiO_2 + Nb_2O_5 + WO_3 + Bi_2O_3)$ | 0.35 | 0.35 | 0.38 | 0.38 | 0.31 | 0.30 | 0.30 | 0.31 | 0.30 | 0.31 |
| $TiO_2/Nb_2O_5$ | 0.82 | 0.82 | 0.82 | 0.82 | 0.44 | 0.42 | 0.43 | 0.45 | 0.43 | 0.45 |
| $TiO_2/(Nb_2O_5 + WO_3 + Bi_2O_3)$ | 0.54 | 0.54 | 0.60 | 0.60 | 0.44 | 0.42 | 0.43 | 0.45 | 0.43 | 0.45 |
| $(Li_2O + Na_2O + MgO + CaO + ZnO + SrO)/(K_2O + BaO)$ | 0.02 | 0.01 | 0.01 | 0.01 | 0.01 | 0.01 | 0.01 | 0.01 | 0.01 | 0.01 |
| $(TiO_2 + Nb_2O_5)/(SiO_2 + B_2O_3 + Li_2O + Na_2O + K_2O + MgO + CaO + ZnO + SrO + BaO)$ | 12.34 | 10.11 | 4.25 | 4.02 | 5.76 | 6.36 | 6.92 | 6.88 | 6.92 | 6.89 |

Example 2

A lens blank was prepared by a known method by using each optical glass prepared in Example 1, and the lens blank was processed by a known method such as polishing to prepare various lenses.

The prepared optical lenses are various lenses such as a planar lens, a biconvex lens, a biconcave lens, a plano-convex lens, a plano-concave lens, a concave meniscus lens, and a convex meniscus lens.

When the various lenses are combined with a lens formed from another kind of optical glass, secondary chromatic aberration can be corrected in a satisfactory manner.

In addition, since the glass has a low specific gravity, each of the lenses is lighter in weight in comparison to a lens having the same optical properties and the same size, and is suitable for a goggle-type or eyeglass-type AR display device or MR display device. In the same manner, a prism was prepared by using the various kinds of optical glass prepared in Example 1.

Example 3

Each optical glass prepared in Example 1 was processed into a rectangular shape having dimensions of 50 mm (length)×20 mm (width)×1.0 mm (thickness), thereby obtaining a light guide plate. The light guide plate was assembled into the head-mounted display 1 illustrated in FIG. 1.

With respect to the head-mounted display obtained in this manner, an image was evaluated at a position of an eye point. From the evaluation, an image with a high luminance and a high contrast could be observed at a wide viewing angle.

It should be considered that the disclosed embodiment is illustrative only in all aspects, and is not restrictive. The scope of the present invention is represented by the accompanying claims rather than the above description, and is intended to include meaning equivalent to the accompanying claims and all modifications in the claims.

For example, the optical glass according to the aspect of the present invention can be prepared by performing an adjustment of the composition described in this specification with respect to the exemplified glass compositions.

In addition, two or more of the matters which are exemplified in this specification or described as preferable ranges may be combined in an arbitrary manner.

What is claimed is:

1. Optical glass, wherein a refractive index nd is 1.950 or more, an amount of $P_2O_5$ is 10.0 to 40.0 mass %, an amount of $TiO_2$ is 18.0 to 40.0 mass %, an amount of $Nb_2O_5$ is 20.0 to 60.0 mass %, an amount of $Bi_2O_3$ is 20.0 mass % or less, an amount of $WO_3$ is 15.0 mass % or less, a total amount of $Al_2O_3$ and $SiO_2$ [$Al_2O_3$+$SiO_2$] is 2.0 mass % or less, a total amount of $Li_2O$, $Na_2O$, and $K_2O$ [$Li_2O$+$Na_2O$+$K_2O$] is 5.0 mass % or less, a total amount of ZnO, SrO, and BaO [ZnO+SrO+BaO] is 0.01 to 12.0 mass %, a mass ratio [$TiO_2$/($TiO_2$+$Nb_2O_5$)] between the amount of $TiO_2$ and the total amount of $TiO_2$ and $Nb_2O_5$ [$TiO_2$+$Nb_2O_5$] is 0.20 to 0.60, a mass ratio [($Li_2O$+$Na_2O$+MgO+CaO+ZnO+SrO)/($K_2O$+BaO)] between a total amount of $Li_2O$, $Na_2O$, MgO, CaO, ZnO, and SrO [$Li_2O$+$Na_2O$+MgO+CaO+ZnO+SrO], and a total amount of $K_2O$ and BaO [$K_2O$+BaO] is 0.51 or less, and a mass ratio [$TiO_2$/([$Li_2O$+$Na_2O$+$K_2O$])] between the amount of $TiO_2$ and the total amount of $Li_2O$, $Na_2O$, and $K_2O$ [$Li_2O$+$Na_2O$+$K_2O$] is 1.0 to 50.

2. The optical glass according to claim 1, wherein a total amount of $P_2O_5$, $TiO_2$, and $Nb_2O_5$ [$P_2O_5$+$TiO_2$+$Nb_2O_5$] is 70.0 to 98.0 mass %.

3. The optical glass according to claim 1, wherein a total amount of MgO, CaO, ZnO, SrO, and BaO [MgO+CaO+ZnO+SrO+BaO] is 0.1 to 12.0 mass %.

4. The optical glass according to claim 1, wherein a total amount of $Li_2O$, $Na_2O$, $K_2O$, MgO, CaO, ZnO, SrO, and BaO [$Li_2O$+$Na_2O$+$K_2O$+MgO+CaO+ZnO+SrO+BaO] is 0.5 to 17.0 mass %.

5. The optical glass according to claim 1, wherein a total amount of $TiO_2$ and $Nb_2O_5$ [$TiO_2$+$Nb_2O_5$] is 40.0 to 80.0 mass %.

6. The optical glass according to claim 1, wherein a mass ratio [$P_2O_5$/($P_2O_5$+$TiO_2$+$Nb_2O_5$)] between the amount of $P_2O_5$ and a total amount of $P_2O_5$, $TiO_2$, and $Nb_2O_5$ [$P_2O_5$+$TiO_2$+$Nb_2O_5$] is 0.15 to 0.40.

7. The optical glass according to claim 1, wherein a mass ratio [$K_2O$/($Li_2O$+$Na_2O$+$K_2O$)] between an amount of $K_2O$ and the total amount of $Li_2O$, $Na_2O$, and $K_2O$ [$Li_2O$+$Na_2O$+$K_2O$] is more than 0.

8. The optical glass according to claim 1, wherein a mass ratio [($Mg_0$+CaO+ZnO+SrO+BaO)/($Li_2O$+$Na_2O$+$K_2O$)] between a total amount of MgO, CaO, ZnO, SrO, and BaO [MgO+CaO+ZnO+SrO+BaO], and the total amount of $Li_2O$, $Na_2O$, and $K_2O$ [$Li_2O$+$Na_2O$+$K_2O$] is 0.10 to 300.

9. The optical glass according to claim 1, wherein a mass ratio [BaO/([MgO+CaO+ZnO+SrO+BaO])] between an amount of BaO and a total amount of MgO, CaO, ZnO, SrO, and BaO [MgO+CaO+ZnO+SrO+BaO] is more than 0.

10. The optical glass according to claim 1, wherein a mass ratio [$TiO_2$/(MgO+CaO+ZnO+SrO+BaO)] between the amount of $TiO_2$ and a total amount of MgO, CaO, ZnO, SrO, and BaO [MgO+CaO+ZnO+SrO+BaO] is 0.1 to 50.0.

11. The optical glass according to claim 1, wherein a mass ratio [$TiO_2$/($TiO_2$+$Nb_2O_5$+$WO_3$+$Bi_2O_3$)] between the amount of $TiO_2$ and a total amount of $TiO_2$, $Nb_2O_5$, $WO_3$, and $Bi_2O_3$ is 0.10 to 0.60.

12. The optical glass according to claim 1, wherein a mass ratio [($TiO_2$+$Nb_2O_5$)/($SiO_2$+$B_2O_3$+$Li_2O$+$Na_2O$+$K_2O$+MgO+CaO+ZnO+SrO+BaO)] between a total amount of $TiO_2$ and $Nb_2O_5$ [$TiO_2$+$Nb_2O_5$] and a total amount of $SiO_2$, $B_2O_3$, $Li_2O$, $Na_2O$, $K_2O$, MgO, CaO, ZnO, SrO, and BaO [$SiO_2$+$B_2O_3$+$Li_2O$+$Na_2O$+$K_2O$+MgO+CaO+ZnO+SrO+BaO] is 0.5 to 20.0.

13. The optical glass according to claim 1, wherein an Abbe number νd is 15.0 to 20.0.

14. The optical glass according to claim 1, wherein a specific gravity is 4.20 or less.

15. The optical glass according to claim 1, wherein a ratio [nd/d] between a refractive index nd and a specific gravity d is 0.48 or more.

16. An optical element blank comprising the optical glass according to claim 1.

17. An optical element comprising the optical glass according to claim 1.

* * * * *